United States Patent
Palanigounder et al.

(10) Patent No.: US 8,839,373 B2
(45) Date of Patent: Sep. 16, 2014

(54) METHOD AND APPARATUS FOR RELAY NODE MANAGEMENT AND AUTHORIZATION

(75) Inventors: Anand Palanigounder, San Diego, CA (US); Adrian Edward Escott, Reading (GB)

(73) Assignee: QUALCOMM Incorporated, San Diego, CA (US)

( * ) Notice: Subject to any disclaimer, the term of this patent is extended or adjusted under 35 U.S.C. 154(b) by 209 days.

(21) Appl. No.: 13/162,332

(22) Filed: Jun. 16, 2011

(65) Prior Publication Data

US 2011/0314522 A1    Dec. 22, 2011

Related U.S. Application Data

(60) Provisional application No. 61/356,409, filed on Jun. 18, 2010.

(51) Int. Cl.
| | |
|---|---|
| *H04W 12/08* | (2009.01) |
| *H04L 12/24* | (2006.01) |
| *H04W 12/06* | (2009.01) |
| *H04B 7/155* | (2006.01) |
| *H04W 84/04* | (2009.01) |
| *H04W 24/02* | (2009.01) |

(52) U.S. Cl.
CPC .......... *H04W 12/06* (2013.01); *H04L 41/0803* (2013.01); *H04L 41/28* (2013.01); *H04W 84/045* (2013.01); *H04B 7/155* (2013.01); *H04W 24/02* (2013.01); *H04W 84/047* (2013.01)
USPC .............. 726/4; 726/2; 726/3; 726/5; 726/11; 726/12; 455/7

(58) Field of Classification Search
None
See application file for complete search history.

(56) References Cited

U.S. PATENT DOCUMENTS

| | | | |
|---|---|---|---|
| 7,424,543 B2 | 9/2008 | Rice et al. | |
| 7,769,175 B2 | 8/2010 | Bajar et al. | |

(Continued)

FOREIGN PATENT DOCUMENTS

| | | |
|---|---|---|
| CN | 101232378 A | 7/2008 |
| CN | 101945386 A | 1/2011 |

(Continued)

OTHER PUBLICATIONS

3GPP TS 33.401 V10.0.0 (Mar. 2011), Technical Specification, 3GPP Organizational Partners, 2011. <http://www.3gpp.org/ftp/tsg_sa/WG3_Security/Drafts/33401-a00.doc>.

(Continued)

*Primary Examiner* — Jung Kim
*Assistant Examiner* — Adrian Stoica
(74) *Attorney, Agent, or Firm* — Won Tae Kim

(57) ABSTRACT

Methods and apparatuses are provided for deploying relay nodes in a communication network. A relay node can initially be wirelessly authenticated to a network entity using initial security credentials. In response to a successful authentication, the relay node is authorized to wirelessly communicate with the communication network for a limited purpose of configuring the relay node for relay device operations. The relay node can receive new security credentials from the communication network, and is subsequently re-authenticated to the network entity using the new security credentials. In response to a successful re-authentication, the relay node is authorized by the network to operate as a relay device for conveying traffic between one or more access terminals and the communication network.

43 Claims, 13 Drawing Sheets

(56) References Cited

U.S. PATENT DOCUMENTS

| | | | |
|---|---|---|---|
| 2002/0061748 | A1 | 5/2002 | Nakakita et al. |
| 2005/0289643 | A1 | 12/2005 | Sato et al. |
| 2006/0059549 | A1 | 3/2006 | Suzuki et al. |
| 2006/0107036 | A1 | 5/2006 | Randle et al. |
| 2008/0022104 | A1 | 1/2008 | Deishi |
| 2008/0040606 | A1 | 2/2008 | Narayanan et al. |
| 2008/0101275 | A1 | 5/2008 | Kang et al. |
| 2008/0162939 | A1 | 7/2008 | Lee et al. |
| 2008/0267153 | A1* | 10/2008 | Mukherjee et al. ........... 370/338 |
| 2009/0233609 | A1* | 9/2009 | Iun et al. ........................ 455/445 |
| 2010/0046418 | A1 | 2/2010 | Horn et al. |
| 2010/0103864 | A1 | 4/2010 | Ulupinar et al. |
| 2010/0125732 | A1* | 5/2010 | Cha et al. ...................... 713/166 |
| 2010/0311419 | A1 | 12/2010 | Bi |
| 2010/0313024 | A1 | 12/2010 | Weniger et al. |
| 2010/0322148 | A1 | 12/2010 | Liu et al. |
| 2011/0002314 | A1* | 1/2011 | Choi et al. .................... 370/338 |
| 2011/0038480 | A1 | 2/2011 | Lin |
| 2011/0314287 | A1 | 12/2011 | Escott et al. |
| 2012/0002594 | A1* | 1/2012 | Racz et al. .................... 370/315 |
| 2012/0044836 | A1* | 2/2012 | Sivavakeesar et al. ........ 370/255 |

FOREIGN PATENT DOCUMENTS

| | | |
|---|---|---|
| EP | 1650903 A1 | 4/2006 |
| EP | 1739903 A1 | 1/2007 |
| EP | 2234366 A1 | 9/2010 |
| JP | 2004318398 A | 11/2004 |
| JP | 3628250 | 3/2005 |
| JP | 2005311904 A | 11/2005 |
| JP | 2006011989 A | 1/2006 |
| JP | 2006065690 A | 3/2006 |
| JP | 2006121526 A | 5/2006 |
| JP | 2008054290 A | 3/2008 |
| JP | 2009124684 A | 6/2009 |
| TW | 200950382 A | 12/2009 |
| WO | WO-2007121190 | 10/2007 |
| WO | WO-2009038522 A1 | 3/2009 |
| WO | WO-2009141919 A1 | 11/2009 |
| WO | WO-2010027821 A2 | 3/2010 |
| WO | WO-2010048565 A1 | 4/2010 |

OTHER PUBLICATIONS

3rd Generation Partnership Project; Technical Specification Group Radio Access Network; Evolved Universal Terrestrial Radio Access (E-UTRA); Relay architectures for E-UTRA (LTE-Advanced) (Release 9), 3GPP Standard; 3GPP TR 36.806, 3rd Generation Partnership Project (3GPP), Mobile Competence Centre; 650, Route Des Lucioles; F-06921 Sophia-Antipolis Cedex; France, No. V9.0.0, Apr. 21, 2010, pp. 1-34, XP050402561, [retrieved on Apr. 21, 2010].

International Search Report and Written Opinion—PCT/US2011/040961, ISA/EPO—Sep. 12, 2011.

Panasonic: "Summary of Email discussion [69#31] LTE: Relay configuration at startup / subframe reconfiguration", 3GPP Draft; R2-102085, 3rd Generation Partnership Project (3GPP), Mobile Competence Centre; 650, Route Des Lucioles; F-06921 Sophia-Antipolis Cedex; France, vol. RAN WG2, No. Beijing, china; 20100412, Apr. 6, 2010, XP050422555, [retrieved on Apr. 6, 2010].

3GPP: "3rd Generation Partnership Project; Technical Specification Group Service and Systems Aspects: Security of H(e)NB; (Release 8)", 3GPP TR 33.820 V8.3.0, vol. 33.820, No. V8.3.0 Dec. 1, 2009, pp. 1-99, XP002650893, Retrieved from the Internet: URL:http://www.quintillion.co.jp/3GPP/Specs/33820-830.pdf Sections 6 and 7.

Chen, et al., "A Secure Relay-Assisted Handover Protocol for Proxy Mobile IPv6 in 3GPP LTE Networks", Wireless Personal Communications, 2010.

3GPP: "3rd Generation Partnership Project; Technical Specification Group Services and System Aspects; Feasibility study on LTE relay node security Release 10", 3GPP TR 33.816, Mar. 2011, V10.0.0, pp. 45-48, & 59-62.

Taiwan Search Report—TW100121246—TIPO—Nov. 20, 2013.

Umezawa T., et al., "A Virtual Networking Method using NFC Mobile," IEICE Technical Report, Japan, The Institute of Electronics, Information and Communication Engineers, Sep. 3, 2009, vol. 109, No. 191, pp. 1-6.

* cited by examiner

METHOD AND APPARATUS FOR RELAY NODE MANAGEMENT AND AUTHORIZATION

CLAIM OF PRIORITY UNDER 35 U.S.C. §119

The present Application for Patent claims priority to U.S. Provisional Application No. 61/356,409 entitled "Method and Apparatus for Relay Node Management and Authorization" filed Jun. 18, 2010, and assigned to the assignee hereof and hereby expressly incorporated by reference herein.

BACKGROUND

1. Field

Various features relate to wireless communications systems and, more particularly, to relay nodes employed in a wireless communications system.

2. Background

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an enhanced node B (eNB), a wireless access point, or a similar component rather than a traditional access node (or base station).

In some implementations, a network may include both access nodes and relay nodes, which may also be referred to herein as a relay device. A relay node is a relatively new network component in a wireless network that is configured to extend or enhance the coverage created by an access node or another relay node. The access node and relay node are both radio components that may be present in a wireless communications network. A relay node typically requires the wireless coverage of an access node or other relay node to access other components in a wireless communications system. Additionally, two or more relay nodes may be used serially to extend or enhance coverage created by an access node.

A relay node typically incorporates both access terminal functions and access node functions. For example, the relay node receives data from the network as if it was an access terminal, and conveys the received data to an access terminal as if it was an access node. In order for a relay node to function properly, the relay node must be properly provisioned/configured with the needed operational and security credentials before the relay node is put into operation. Since newly deployed relay nodes may not have existing communication links to an operator's management system (e.g., an operator's Operation, Administration, Maintenance, and Provisioning (OAM&P) system), the relay nodes conventionally require operator personnel to be onsite to initially configure the relay node. However, requiring operator personnel at the relay deployment site is expensive, error-prone and not secure. The other conventional alternative is to use the operator's pre-existing communication methods, such as leased IP links or wireless microwave links, to communicate with the operator's management system. However, providing connection to the relay node via these other forms of communication is also expensive.

It is, therefore, desirable to enable a relay node to securely connect to a management system for initial configuration and authorization prior to deployment as a fully functioning relay device in a communications network for transmitting traffic between access terminals and other network entities.

SUMMARY

Various features facilitate wireless configuration and authorization of relay nodes prior to deployment as a relay device in a communications network. One feature provides relay nodes including a wireless communication interface coupled with a processing circuit. The processing circuit may be adapted to authenticate the relay node to a network entity using initial security credentials for the authentication. In response to the wireless authentication using the initial security credentials, the processing circuit may receive authorization to wirelessly communicate with a communication network for a limited purpose of configuring the relay node. As part of the limited communications, the processing circuit can receive new security credentials via the wireless communication interface. The processing circuit may then re-authenticate to the network entity using the new security credentials prior to operating as a relay device in the communication network.

Methods operational in a relay node are also provided according to a feature for facilitating wireless configuration and authorization of the relay node prior to deployment as a relay device in a communication network. In at least one implementation of such methods, for instance, the relay node may be wirelessly authenticated to a network entity using initial security credentials. Authorization may be received to wirelessly communicate with a communication network for a limited purpose of configuring the relay node on authentication, where the authorization is received in response to the wireless authentication using the initial security credentials. As part of the limited communications, new security credentials can be received. The relay node may then be re-authenticated to the network entity using the new security credentials prior to being enabled to operate as a relay device in the communication network.

Another feature provides one or more network entities adapted to facilitate wireless configuration and authorization of relay nodes prior to deployment as a relay device in a communication network. Such a network entity may comprise a communications interface coupled with a processing circuit. The processing circuit may be adapted to authenticate a relay node using initial security credentials associated with the relay node. The processing circuit may authorize the relay node to wirelessly communicate with a communication network for a limited purpose of configuring the relay node after a successful authentication of the relay node using the initial security credentials. The processing circuit can also re-authenticate the relay node using new security credentials associated with the relay node, and can authorize the relay node to operate as a relay device in the communication network after successfully re-authenticating the relay node.

Methods operational in a network entity are also provided according to a feature for facilitating wireless configuration and authorization of a relay node prior to deployment as a relay device in a communication network. In at least one implementation of such methods, for instance, the network entity may authenticate a relay node using initial security credentials associated with the relay node. The relay node may be authorized to wirelessly communicate with a communication network for a limited purpose of configuring the relay node after successfully authenticating the relay node using the initial security credentials. The relay node may be re-authenticated using new security credentials, and the relay node may be authorized to operate as a relay device in the communication network after successfully re-authenticating the relay node with the new security credentials.

DETAILED DESCRIPTION

In the following description, specific details are given to provide a thorough understanding of the described implementations. However, it will be understood by one of ordinary skill in the art that various implementations may be practiced without these specific details. For example, circuits may be shown in block diagrams in order not to obscure the implementations in unnecessary detail. In other instances, well-known circuits, structures and techniques may be shown in detail in order not to obscure the described implementations.

The word "exemplary" is used herein to mean "serving as an example, instance, or illustration." Any implementation or embodiment described herein as "exemplary" is not necessarily to be construed as preferred or advantageous over other embodiments or implementations. Likewise, the term "embodiments" does not require that all embodiments include the discussed feature, advantage or mode of operation.

Overview

One feature facilitates initial deployment of relay nodes within a communication network. A relay node initially attaches wirelessly to the communication network and is authenticated using initial security parameters pre-provisioned on the relay node. Upon authentication, the relay node is authorized to wirelessly communicate with the communication network for the limited scope of obtaining new security credentials and configuration data. After the relay node is configured for operation as a relay device in the network, the relay node re-attaches to the communication network and is re-authenticated. The re-authentication is based on the new security credentials received during the period of limited access for the relay node. After the relay node is re-authenticated, the relay node is authorized to operate in the communication network as a relay device conveying traffic between one or more access terminals and the communication network.

Exemplary Network Environment

Figure 1:
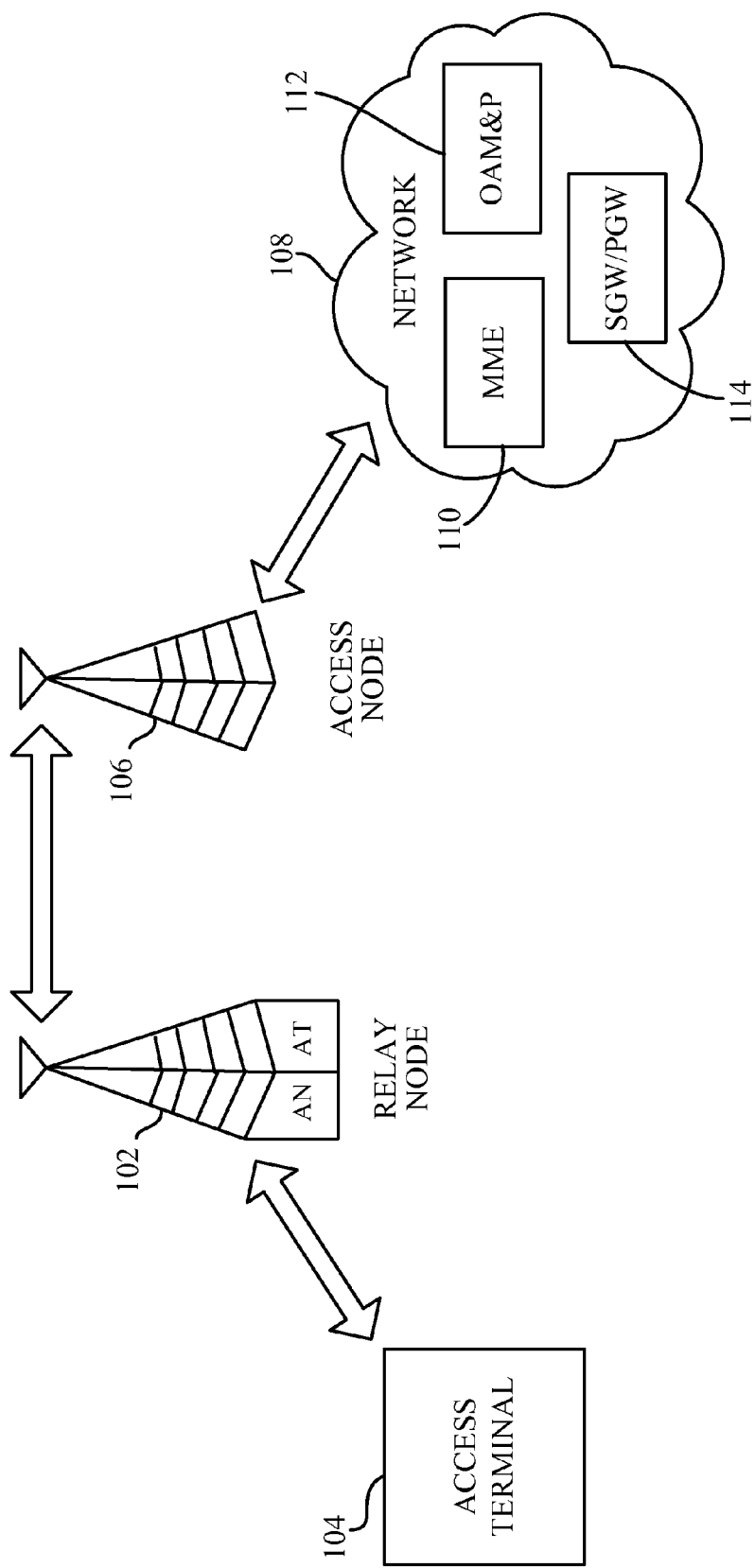
FIG. 1 is a block diagram illustrating a wireless communication system employing one or more relay nodes and adapted to facilitate wireless configuration and authorization of a relay node when initially deployed.

FIG. 1 is a block diagram illustrating a wireless communication system employing one or more relay nodes and adapted to facilitate wireless configuration and authorization of a relay node when initially deployed. In at least some implementations, relay nodes 102 are employed in wireless communications networks, such as LTE or LTE-Advanced (LTE-A) networks. The relay node 102 can amplify or repeat a signal received from an access terminal 104 and cause the modified signal to be received at an access node 106. In general, the relay node 102 can appear to the access terminal 104 as an access node (AN) and can appear to the access node as an access terminal (AT), as shown in FIG. 1. In some implementations, the relay node 102 receives a signal with data from the access terminal 104 and then generates a new signal to transmit the data to the access node 106. The relay node 102 can also receive data from the access node 106 and deliver the data to the access terminal 104. The relay node 102 might be placed near the edges of a cell so that the access terminal 104 can communicate with the relay node 102 rather than communicating directly with the access node 106 for that cell.

In radio systems, a cell is a geographical area of reception and transmission coverage. Cells can overlap with each other. In the typical example, there is one access node associated with each cell. The size of a cell is determined by factors such as frequency band, power level, and channel conditions. Relay nodes, such as relay node 102, can be used to enhance coverage within or near a cell, or to extend the size of coverage of a cell. Additionally, the use of a relay node 102 can enhance throughput of a signal within a cell because the access terminal 104 can access the relay node 102 at a higher data rate or a lower power transmission than the access terminal 104 might use when communicating directly with the access node 106 for that cell. Transmission at a higher data rate creates higher spectrum efficiency, and lower power benefits the access terminal 104 by consuming less battery power.

A relay node 102 can be implemented as one of three types: a layer one relay node, a layer two relay node, and a layer three relay node. A layer one relay node is essentially a repeater that can retransmit a transmission without any modification other than amplification and slight delay. A layer two relay node can decode a transmission that it receives, re-encode the result of the decoding, and then transmit the re-encoded data. A layer three relay node can have full radio resource control capabilities and can thus function similarly to an access node. The radio resource control protocols used by a relay node may be the same as those used by an access node, and the relay node may have a unique cell identity typically used by an access node.

For the purpose of this disclosure, a relay node 102 is distinguished from an access node 106 by the fact that the relay node 102 may rely on the presence of at least one access node 106 (and the cell associated with that access node) or other relay node to access other components in a telecommunications system (e.g., the network 108). That is, the relay node 102 may appear as a subscriber device, client device, or access terminal to the network, therefore it connects to an access node to communicate over the network. However, to other subscriber devices, user devices, and/or access terminals the relay node 102 may appear as a network device (e.g., an access node). Consequently, the relay node 102 may implement one or more communication interfaces to communicate with an access node and/or one or more access/subscriber/user terminals. In one example, the same transmitter/receiver (e.g., in one or more wireless channels) may be used by the relay node 102 to communicate with its access node and/or one or more access terminals. In another example, the relay node 102 may utilize two or more different transmitters/receivers to communicate with the access node and/or the one or more access terminals.

The access node 106 can be coupled with the network 108 (e.g., a core network) via a backhaul link. The network 108 can include one or more mobile management entities (MME) 110, an operations, administration, maintenance, and provisioning (OAM&P) system 112, and serving and PDN gateways (SGW/PGW) 114.

When the relay node 102 is initially installed and set up, the relay node 102 is adapted to securely connect to the network 108 in order to be configured and authorized to function as a relay node. In particular, the relay node 102 includes initial security credentials, which enable the relay node 102 to attach to the network 108 via an access node 106 using the communication network, such as a LTE or LTE-A network, as the backhaul. The relay node 102 may be allowed to access only the management network elements necessary for configuration and authorization, such as a mobile management entity (MME) 110 and an operations, administration, maintenance, and provisioning (OAM&P) system 112.

The management network elements may then configure the relay node 102 with the necessary operational information, including new security credentials. After the relay node 102 is configured and provided with any new security credentials, the relay node 102 can re-authenticate to the network 108 using the new security credentials and the provided operational information that enable the relay node 102 to operate as a full functioning relay device.

The initial security credentials may include one or more keys, certificates, and/or subscriber/account information used to, for example, connect to a network, obtain service from a network, initiate a communication session, and/or secure a communication link. By way of example and not limitation, the initial and new security credentials may relate to a master key and/or algorithms employed with a master key for generating a plurality of other ciphering and/or integrity keys.

Figure 10:
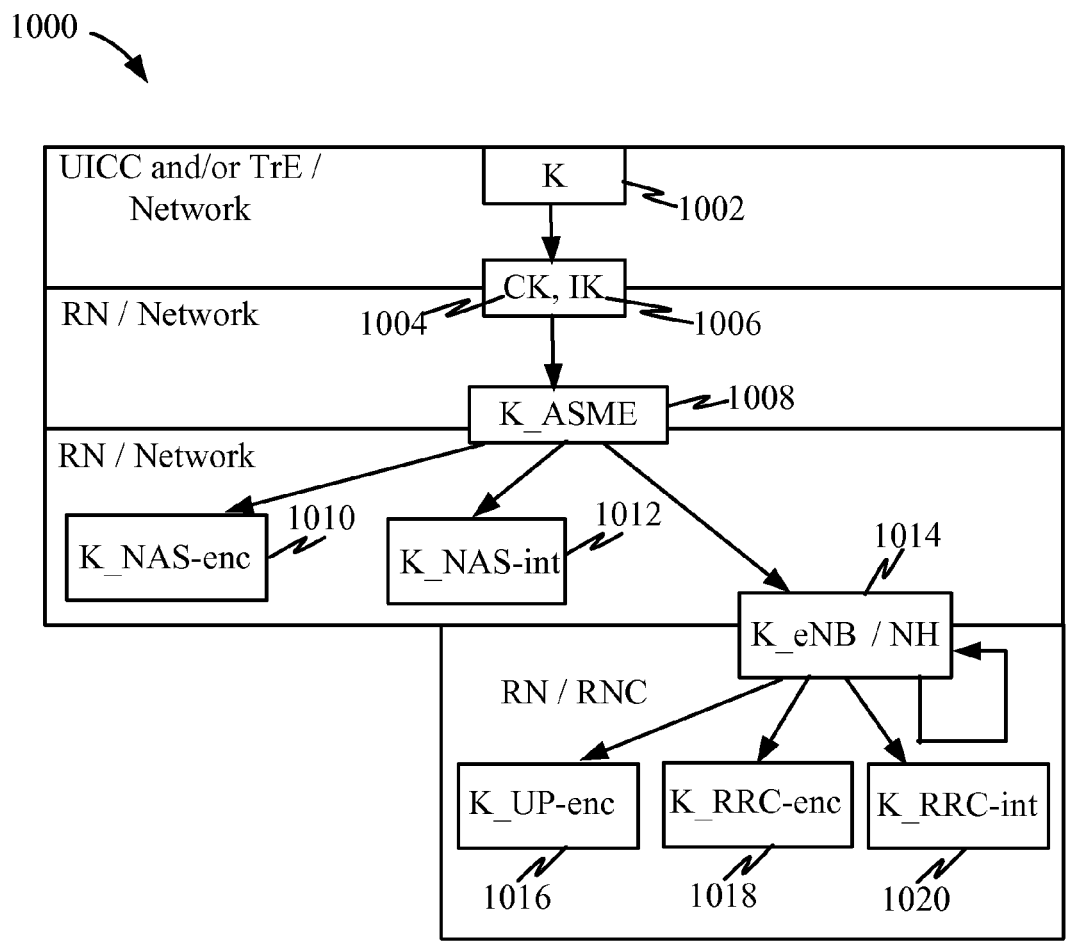
FIG. 10 illustrates an example of how initial security credentials may be used to generate a key hierarchy that may be implemented within a typical wireless communication network.

FIG. 10 illustrates an example of how initial security credentials may be used to generate a key hierarchy 1000 that may be implemented within a typical wireless communication network to establish encryption or security keys for use in encrypting communications between a relay node 102 and the network 108. The relay node 102 (e.g., in a universal integrated circuit card (UICC) and/or a trusted environment (TrE)) and the network 108 can use a master key K 1002 to generate a cipher key (CK) 1004 and integrity key (IK) 1006. The cipher key (CK) 1004 and integrity key (IK) 1006 may then be used by the relay node 102 and the network 108 to generate an Access Security Management Entity key K_ASME 1008. The security activation of a relay node 102 may be accomplished through an Authentication and Key Agreement procedure (AKA), Non-Access Stratum (NAS) Security Mode Configuration (NAS SMC) procedure and/or Access Stratum (AS) Security mode Configuration (AS SMC) procedure. AKA is used to derive the key K_ASME 1008, which can be used as a base key for the calculation of NAS (Non-Access Stratum) keys 1010 and 1012 and AS (Access Stratum) keys 1014, 1016, 1018, and 1020. The relay node 102 and the network 108 may then use the K_ASME 1008 to generate one or more of these security keys.

Exemplary Initial Configuration and Authorization of a Relay Node

Figure 2:
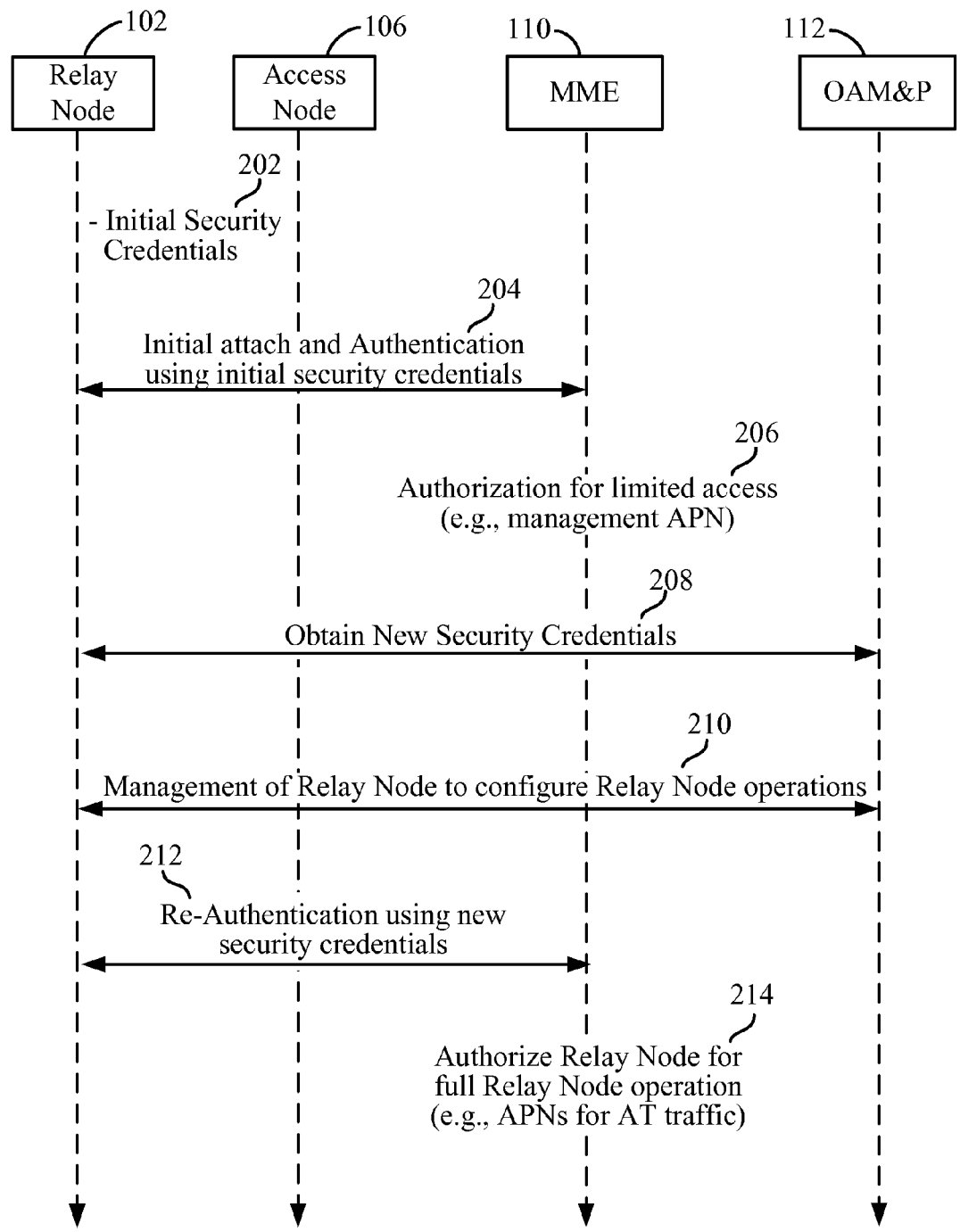
FIG. 2 is a flow diagram illustrating an example of at least one implementation for initially configuring and authorizing a relay node.

FIG. 2 is a flow diagram illustrating an example of at least one implementation for initially configuring and authorizing a relay node. The relay node 102, access node 106, mobile management entity 110 and operations, administration, maintenance, and provisioning (OAM&P) system 112 from FIG. 1 are shown for illustration purposes. The access node 106 is included to illustrate that the communications between the relay node 102 and the various network entities is facilitated through the access node 106.

Initially, the relay node 102 is provided with security credentials 202 that will enable the relay node 102 to attach to the network using the wireless communication network as the backhaul and allowing limited access to the management network elements. The initial security credentials may include an identity of the relay node 102 (e.g., international mobile subscriber identity (IMSI)), as well as one or more secret pre-shared keys and/or certificates.

The relay node 102 can communicate with the mobile management entity (MME) 110 via the access node 106 to initially attach to the network and to be authenticated 204. The relay node 102 may initially attach to the network as a user device (e.g., as an access terminal). That is, from the perspective of the access node 106 and the network, the relay node 102 may appear as a user device when the relay node 102 initially attaches to the network. The relay node 102 can be authenticated to the network using the initial security credentials. For example, the mobile management entity (MME) 110 may perform a challenge-response or other conventional authentication procedure or algorithm using the initial security parameters associated with the relay node 102.

If the relay node 102 is authenticated, the mobile management entity (MME) 110 may authorize the relay node 102 for limited access to the network 206. For example, the mobile management entity (MME) 110 may restrict the destinations the relay node 102 can reach within the network. In some implementations, the relay node 102 can be restricted to accessing those entities in the network that are employed for relay node management and configuration, such as the network operator's operations, administration, maintenance, and provisioning (OAM&P) system 112. Such restriction can, in at least some implementations, be carried out by restricting the access point names which the relay node 102 is permitted to access. These restrictions may be defined by a subscription profile associated with the relay node identity (e.g., IMSI) included with the initial security credentials.

The relay node 102 can communicate with one or more management and configuration network entities (e.g., the operations, administration, maintenance, and provisioning (OAM&P) system 112) to obtain new security credentials 208. In at least some implementations, the new security credentials may include an operator certificate and/or a new shared key issued to the relay node 102 from a certificate authority. In at least some implementations, the new security credentials may include new authentication and key agreement (AKA) credentials. Such new authentication and key agreement (AKA) credentials may include a new relay node identity (e.g., IMSI) and/or a new shared key.

The relay node 102 can also obtain additional management and configuration data 210 from the management and configuration network entity (e.g., from the Operation, Administration, Maintenance, and Provisioning (OAM&P) system 112). The management and configuration data obtained from the network entity (e.g., OAM&P 112) can include configuration information for enabling the relay node 102 to operate as a relay device within the communication network. That is, the relay node 102 may obtain the proper configuration information to enable the relay node 102 to convey network traffic between access terminals and network entities (e.g., access nodes and/or other relay nodes).

Having received the new security credentials (i.e., the operator credentials, the new AKA credentials, or both), the relay node 102 re-authenticates itself with the network using the new security credentials 212. For example, the relay node 102 can re-attach with the mobile management entity (MME) 110 and be re-authenticated by the mobile management entity (MME) 110 using at least the new security credentials.

If the relay node 102 is re-authenticated with the new security credentials, the mobile management entity (MME) 110 can authorize the relay node 102 to function as a fully operational relay device. That is, the relay node 102 may be authorized to access any network entity necessary to fulfill its function as a relay device that conveys network traffic between access terminals and network entities. In at least some implementations, this may include the mobile management entity (MME) 110 authorizing the relay node 102 to access any access point name(s) (APN) needed for conveying traffic to and/or from one or more access terminals. Such access may be defined by a subscription profile associated with the relay node identity (e.g., new IMSI or initial IMSI) included with the security credentials employed for the re-authentication procedure.

Figure 3A:
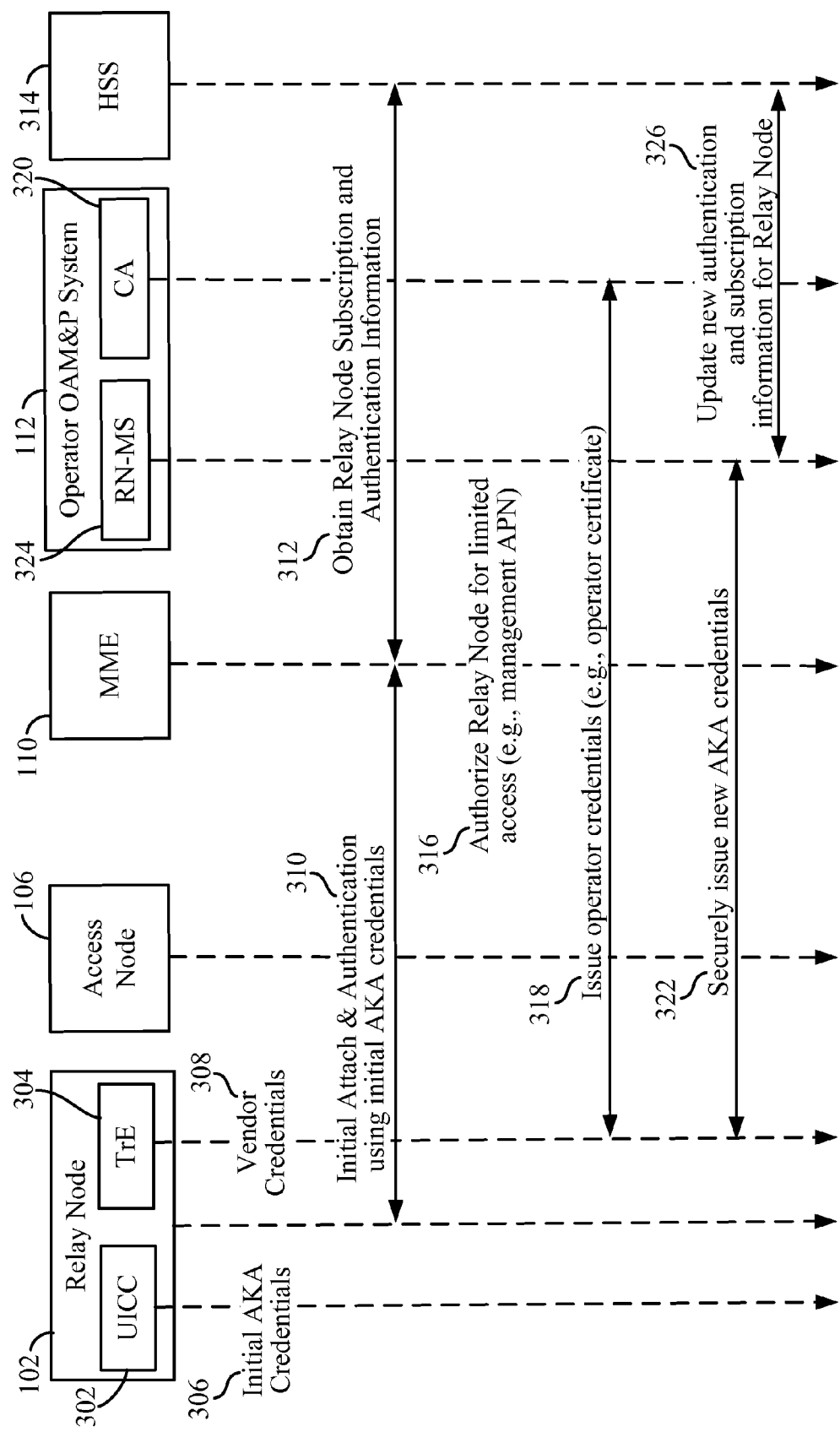
FIG. 3 (comprising of FIG. 3A and FIG. 3B) is a flow diagram illustrating at least one example of initial configuration and authorization of a relay node using the new security credentials for re-authentication.
Figure 3B:
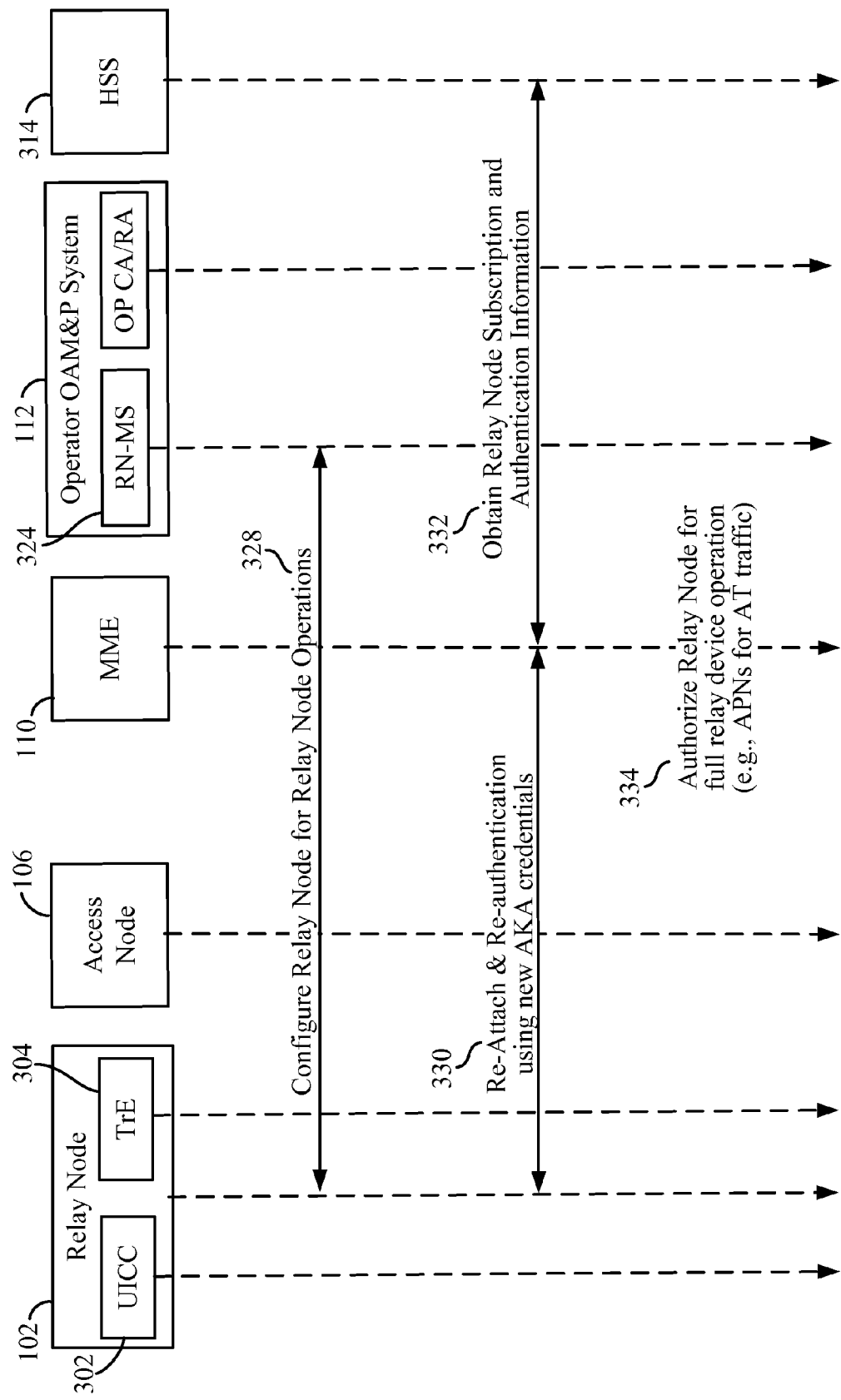

First Exemplary Initial Configuration and Authorization of Relay Nodes Using New AKA Credentials for Re-Authentication FIG. 3 (comprising of FIG. 3A and FIG. 3B) is a flow diagram illustrating at least one example of initial configuration and authorization of a relay node using the new security credentials for re-authentication. In the example of FIG. 3, the relay node 102, access node 106, mobile management entity 110 and Operation, Administration, Maintenance, and Provisioning (OAM&P) system 112 are shown for illustration purposes. The access node 106 is included to illustrate that the communications between the relay node 102 and the various network entities is facilitated through the access node 106.

In the example of FIG. 3, the relay node 102 employs both a universal integrated circuit card (UICC) 302 and a trusted environment (TrE) 304 (also known as a trusted execution environment or TEE). The UICC 302 may be part of a removable module while the TrE 304 may be implemented within a processor (e.g., distinct from the UICC) of the relay node 102. Referring initially to FIG. 3A, the UICC 302 may include a universal subscriber identity module (USIM) application, and can comprise initial security credentials securely provisioned therein. For example, the UICC 302 may include initial security credentials comprising initial authentication and key agreement (AKA) credentials that are securely provisioned 306 therein. Furthermore, the relay node 102 may include vendor credentials securely provisioned and held in the trusted environment (TrE) 304 of the relay node 102. A trusted environment (TrE) 304 of a node is specified in the 3GPP Specification Detail at TS 33.320, the entire disclosure of which is expressly incorporated herein by this reference.

The relay node 102 can attach (or wirelessly connect) to the mobile management entity (MME) 110 and be authenticated 310 using the initial authentication and key agreement credentials stored in the UICC 302. In order to authenticate the relay node 102, the mobile management entity (MME) 110 may obtain the relay node subscription and authentication information 312 from a home subscriber server (HSS) 314. Using the subscription and authentication information obtained from the home subscriber server (HSS) 314, the mobile management entity (MME) 110 and the relay node 102 may communicate to authenticate the relay node 102. For example, the mobile management entity (MME) 110 may obtain a shared secret associated with an identity (e.g., IMSI) of the relay node 102, and may employ an authentication algorithm to verify the relay node 102. After the mobile management entity (MME) 110 authenticates the relay node 102, the mobile management entity (MME) 110 may authorize the relay node 102 limited access to the network at step 316. For example, the mobile management entity (MME) 110 can authorize access for the relay node 102 to limited access point names (APNs), such as to the operator's OAM&P system 112.

In at least some implementations, the operator's OAM&P system 112 may issue 318 operator credentials (e.g., an operator certificate) to the relay node 102. The operator credentials may be issued by a certificate authority (CA) 320 of the operator's OAM&P system 112. In the implementation illustrated, the operator credentials can be stored in the trusted environment (TrE) 304 of the relay node 102. The operator credentials can be securely issued to the relay node 102 using the vendor credentials (e.g., private and public key pair) held in the trusted environment (TrE) 304 of the relay node 102.

The relay node 102 can receive 322 new authentication and key agreement (AKA) credentials issued from the operator's OAM&P system 112. For instance, the new authentication and key agreement (AKA) credentials may be issued from the operator's OAM&P system 112 and stored in the trusted environment (TrE) 304 of the relay node 102 for use in subsequent authentication and key agreement (AKA) communications of the relay node 102. The new authentication and key agreement (AKA) credentials can be issued securely by a relay node management server (RN-MS) 324 of the operator's OAM&P system 112 using a private/public key pair associated with the vendor credentials or the operator credentials (if issued) in the trusted environment (TrE) 304. By way of example and not limitation, the new authentication and key agreement (AKA) credentials may include a new international mobile subscriber identity (IMSI) and/or an encryption key and authentication and key agreement (AKA) algorithm customization parameters. For instance, the encryption key and AKA algorithm customization parameters may comply with the MILENAGE algorithm, with the AKA customization parameters comprising an operator specific algorithm configuration field (e.g., OP field), and the encryption key (e.g., OPc) being derived from the operator specific algorithm configuration field. The operator's OAM&P system 112 also updates 326 the home subscriber server (HSS) 314 with the new authentication and subscription information associated with the relay node 102.

Referring now to FIG. 3B, the operator's OAM&P system 112 may also manage 328 the relay node 102 to configure the relay node 102 for use in the communication network as a relay device that conveys traffic between access terminals and network entities (e.g., access nodes, other relay nodes). Any conventional management protocol may be used for configuring the relay node 102 such as, for example, TR-069 or existing OAM&P protocols.

After the relay node 102 has received the new authentication and key agreement (AKA) credentials, and prior to operating in the network as a fully functioning relay device, the relay node 102 re-attaches to the network and is re-authenticated 330 using the new authentication and key agreement (AKA) credentials stored in the trusted environment (TrE)

304 of the relay node 102. For instance, the mobile management entity (MME) 110 may obtain 332 the relay node's new subscription and authentication information from the home subscriber server (HSS) 314. Using the subscription and authentication information obtained from the home subscriber server (HSS) 314, the mobile management entity (MME) 110 and the relay node 102 can communicate to authenticate the relay node 102. For example, the mobile management entity (MME) 110 may obtain the new shared secret associated with a new identity (e.g., IMSI) of the relay node 102, and may employ an authentication algorithm to verify the relay node 102.

After the relay node 102 is authenticated using the new authentication and key agreement (AKA) credentials, the mobile management entity (MME) 110 may authorize 334 the relay node 102 as a fully operational relay device. That is, the relay node 102 may be authorized for access to any access point names (APNs) necessary for conveying traffic to and/or from one or more access terminals. The relay node 102 may appear as a network device to subscriber or client terminals that use the relay node for relaying communications to the communication network.

Figure 4A:
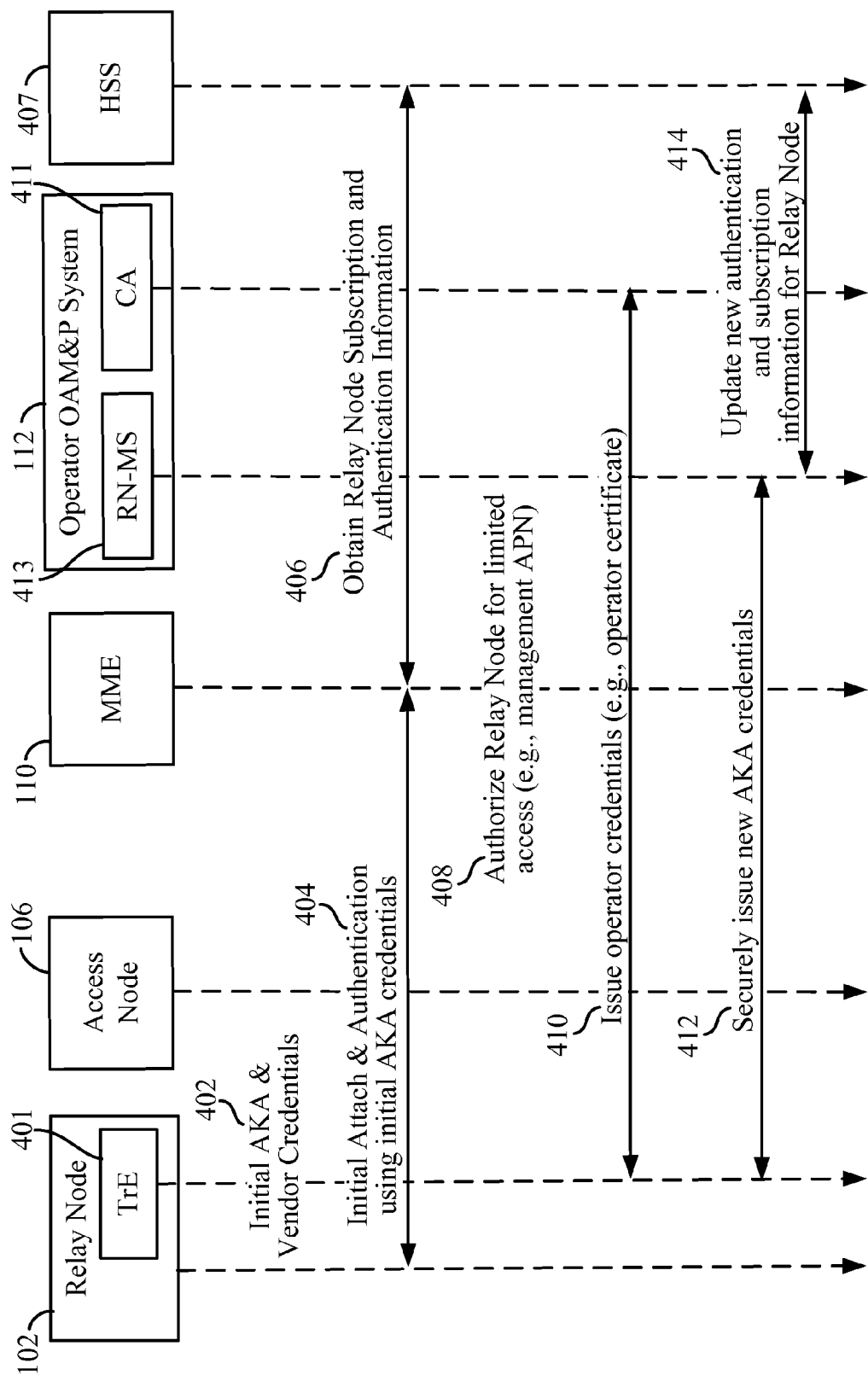
FIG. 4 (comprising of FIG. 4A and FIG. 4B) is a flow diagram illustrating at least one example of initial configuration and authorization of a relay node using the new security credentials for re-authentication.
Figure 4B:
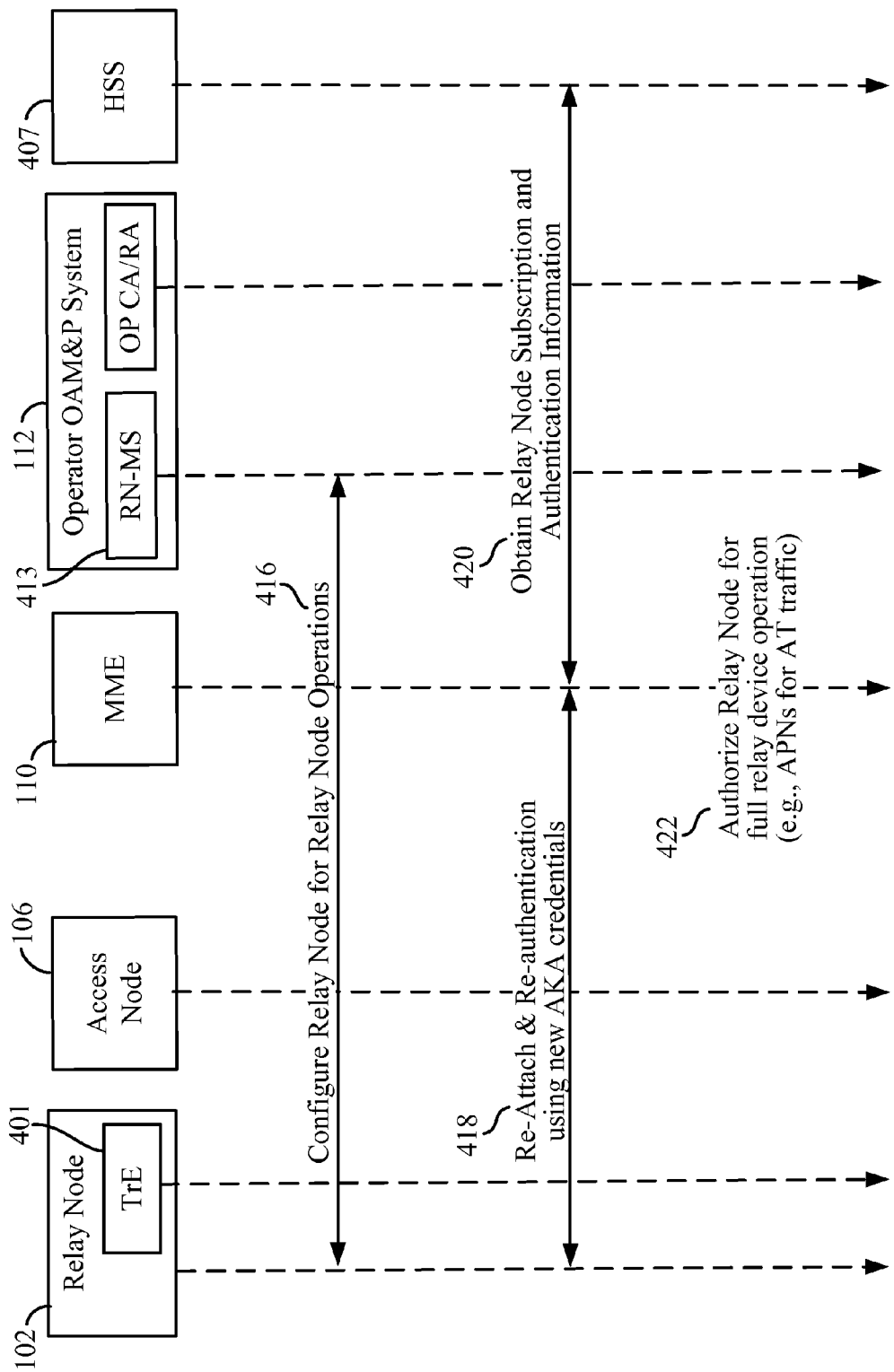

FIG. 4 (comprising of FIG. 4A and FIG. 4B) is a flow diagram illustrating at least one example of initial configuration and authorization of a relay node using the new security credentials for re-authentication. In the example of FIG. 4, the relay node 102, access node 106, mobile management entity 110 and Operation, Administration, Maintenance, and Provisioning (OAM&P) system 112 are shown for illustration purposes. The access node 106 is included to illustrate that the communications between the relay node 102 and the various network entities is facilitated through the access node 106.

In the example of FIG. 4, the relay node 102 employs a trusted environment (TrE) 401. Referring initially to FIG. 4A, the trusted environment (TrE) 401 comprises initial security credentials securely provisioned therein. For example, the trusted environment (TrE) 401 may include initial security credentials comprising initial authentication and key agreement (AKA) credentials (e.g., a relay node identity (IMSI) and/or a shared key) and vendor credentials 402 that are securely provisioned therein.

The relay node 102 can attach (or wirelessly connect) to the mobile management entity (MME) 110 and be authenticated using the initial authentication and key agreement credentials 404 stored in the trusted environment (TrE) 401. In order to authenticate the relay node 102, the mobile management entity (MME) 110 may obtain the relay node subscription and authentication information 406 from a home subscriber server (HSS) 407. Using the subscription and authentication information obtained from the home subscriber server (HSS) 407, the mobile management entity (MME) 110 and the relay node 102 may communicate to authenticate the relay node 102. For example, the mobile management entity (MME) 110 may obtain a shared secret associated with an identity (e.g., IMSI) of the relay node 102, and may employ an authentication algorithm to verify the relay node 102.

After the mobile management entity (MME) 110 authenticates the relay node 102, the mobile management entity (MME) 110 may authorize the relay node 102 limited access to the network at step 408. For example, the mobile management entity (MME) 110 can authorize access for the relay node 102 to limited access point names (APNs), such as to the operator's OAM&P system 112.

In at least some implementations, the operator's OAM&P system 112 may issue 410 operator credentials (e.g., an operator certificate) to the relay node 102. The operator credentials may be issued by a certificate authority (CA) 411 of the operator's OAM&P system 112. In the implementation illustrated, the operator credentials are stored in the trusted environment (TrE) 401 of the relay node 102. The operator credentials can be securely issued to the relay node 102 using the vendor credentials (e.g., private and public key pair) held in the trusted environment (TrE) 401 of the relay node 102.

The relay node 102 can receive new authentication and key agreement (AKA) credentials 412 issued from the operator's OAM&P system 112. For instance, the new authentication and key agreement (AKA) credentials may be issued from the operator's OAM&P system 112 and stored in the trusted environment (TrE) 401 of the relay node 102 for use in subsequent authentication and key agreement (AKA) communications of the relay node 102. The new authentication and key agreement (AKA) credentials can be issued securely by a relay node management server (RN-MS) 413 of the operator's OAM&P system 112 using a private/public key pair associated with the vendor credentials or the operator credentials (if issued) stored in the trusted environment (TrE) 401. By way of example and not limitation, the new authentication and key agreement (AKA) credentials may include a new international mobile subscriber identity (IMSI) and/or an encryption key and authentication and key agreement (AKA) algorithm customization parameters. For instance, the encryption key and AKA algorithm customization parameters may comply with the MILENAGE algorithm, with the AKA customization parameters comprising an operator specific algorithm configuration field (e.g., OP field), and the encryption key (e.g., OPc) being derived from the operator specific algorithm configuration field. The operator's OAM&P system 112 also updates 414 the home subscriber server (HSS) 407 with the new authentication and subscription information associated with the relay node 102.

Referring now to FIG. 4B, the operator's OAM&P system 112 may also manage 416 the relay node 102 to configure the relay node 102 for use in the communication network as a relay device that conveys traffic between access terminals and network entities (e.g., access nodes, other relay nodes). Any conventional management protocol may be used for configuring the relay node 102 such as, for example, TR-069 or existing OAM&P protocols.

After the relay node 102 has received the new authentication and key agreement (AKA) credentials, and prior to operating in the network as a fully functioning relay device, the relay node 102 re-attaches to the network and is re-authenticated 418 using the new authentication and key agreement (AKA) credentials stored in the trusted environment (TrE) 401 of the relay node 102. For instance, the mobile management entity (MME) 110 may obtain 420 the relay node's new subscription and authentication information from the home subscriber server (HSS) 407. Using the subscription and authentication information obtained from the home subscriber server (HSS) 407, the mobile management entity (MME) 110 and the relay node 102 can communicate to authenticate the relay node 102. For example, the mobile management entity (MME) 110 may obtain the new shared secret associated with a new identity (e.g., IMSI) of the relay node 102, and may employ an authentication algorithm to verify the relay node 102.

After the relay node 102 is authenticated using the new authentication and key agreement (AKA) credentials, the mobile management entity (MME) 110 may authorize 422 the relay node 102 as a fully operational relay device. That is, the relay node 102 may be authorized for access to any access point names (APNs) necessary for conveying traffic to and/or from one or more access terminals.

Figure 5A:
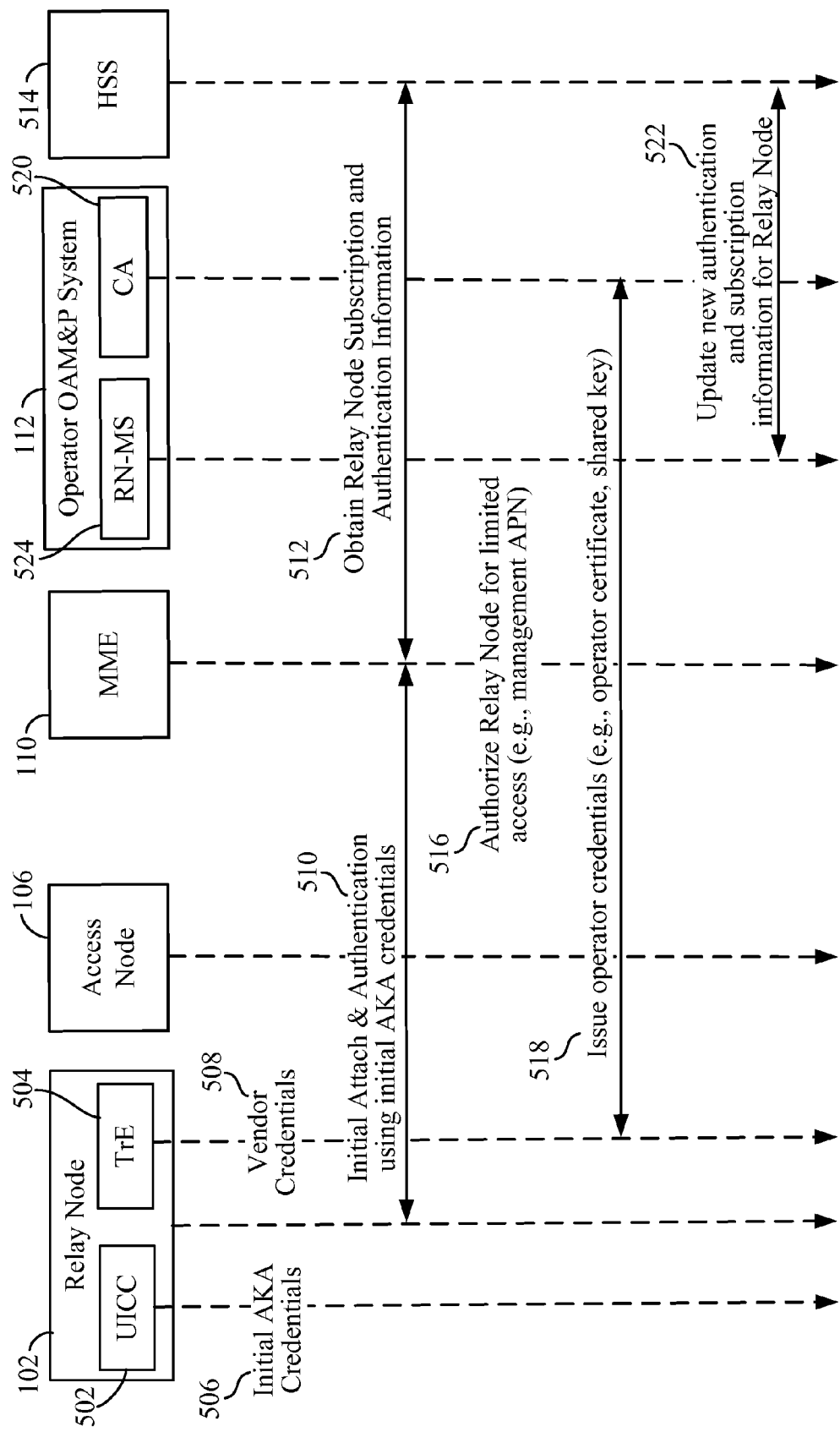
FIG. 5 (comprising of FIG. 5A and FIG. 5B) is a flow diagram illustrating at least one example of initial configuration and authorization of a relay node using the initial security credentials together with new security credentials for re-authentication.
Figure 5B:
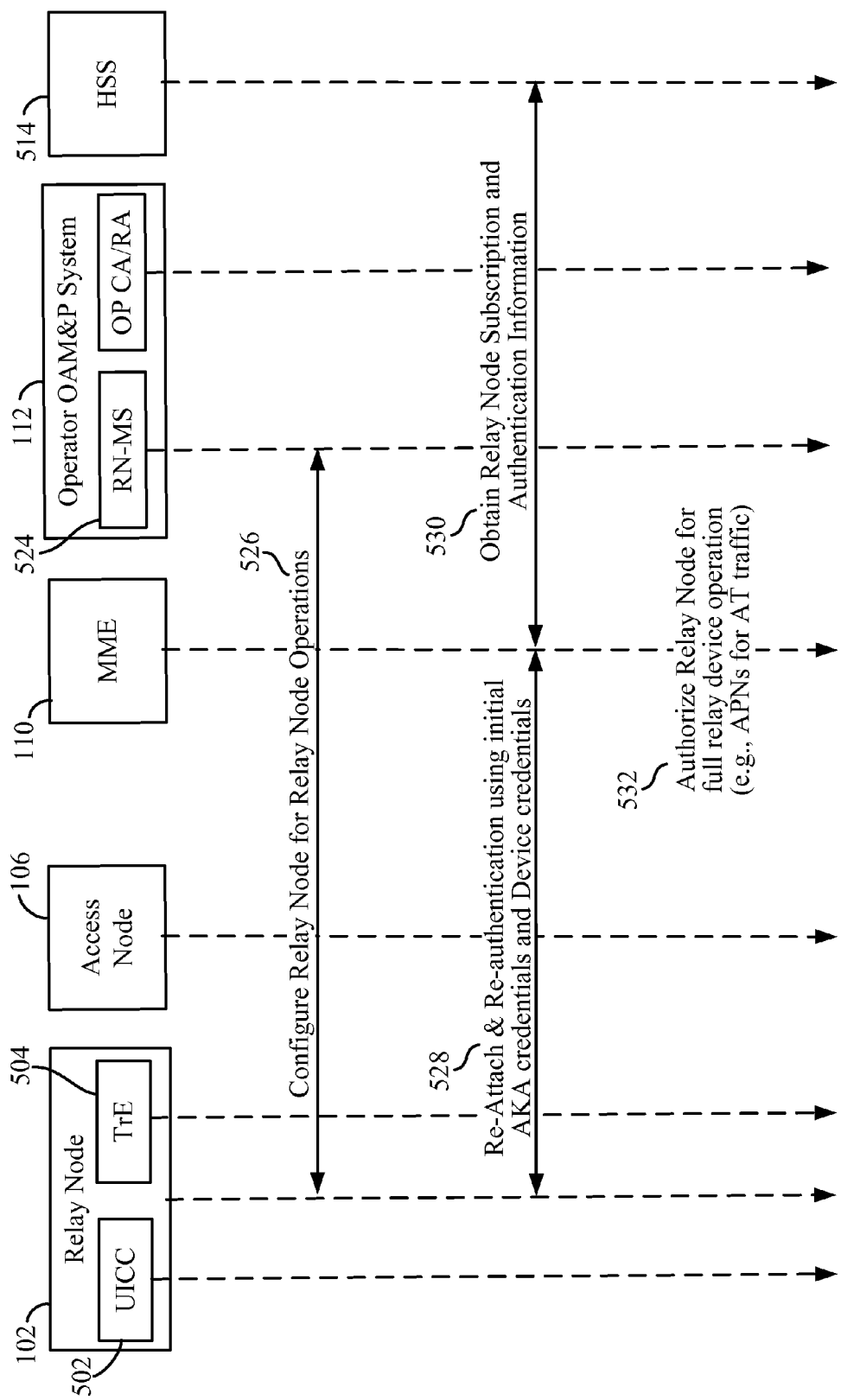

Second Exemplary Initial Configuration and Authorization of Relay Nodes Using the Initial AKA Credentials for Re-Authentication FIG. 5 (comprising of FIG. 5A and FIG. 5B) is a flow diagram illustrating at least one example of initial configuration and authorization of a relay node using the initial security credentials together with new security credentials for re-authentication. In the example of FIG. 5, the relay node 102, access node 106, mobile management entity 110 and Operation, Administration, Maintenance, and Provisioning (OAM&P) system 112 are shown for illustration purposes. The access node 106 is included to illustrate that the communications between the relay node 102 and the various network entities is facilitated through the access node 106.

In the example of FIG. 5, the relay node 102 employs both a universal integrated circuit card (UICC) 502 and a trusted environment (TrE) 504. Referring initially to FIG. 5A, the UICC 502 may include a universal subscriber identity module (USIM) application, and can comprise initial security credentials securely provisioned therein. For example, the UICC 502 may include initial security credentials comprising initial authentication and key agreement (AKA) credentials that are securely provisioned 506 therein. Furthermore, the relay node 102 may include vendor credentials securely provisioned and held in the trusted environment (TrE) 504 of the relay node 102.

The relay node 102 can attach (or wirelessly connect) to the mobile management entity (MME) 110 and be authenticated 510 using the initial authentication and key agreement credentials stored in the UICC 502. In order to authenticate the relay node 102, the mobile management entity (MME) 110 may obtain the relay node subscription and authentication information 512 from a home subscriber server (HSS) 514. Using the subscription and authentication information obtained from the home subscriber server (HSS) 514, the mobile management entity (MME) 110 and the relay node 102 may communicate to authenticate the relay node 102. For example, the mobile management entity (MME) 110 may obtain a shared secret associated with an identity (e.g., IMSI) of the relay node 102, and may employ an authentication algorithm to verify the relay node 102.

After the mobile management entity (MME) 110 authenticates the relay node 102, the mobile management entity (MME) 110 may authorize the relay node 102 limited access to the network at step 516. For example, the mobile management entity (MME) 110 can authorize access for the relay node 102 to limited access point names (APNs), such as to the operator's OAM&P system 112. In at least some implementations, the limited access may be defined by the subscription profile obtained from the home subscriber server (HSS) 514. That is, the home subscriber server (HSS) 514 may provide the subscription profile associated with the relay node identity (e.g., IMSI), where the subscription profile indicates that the relay node 102 is authorized to access a limited number of entities (e.g., a limited number of access point names (APNs)).

The operator's OAM&P system 112 can issue operator credentials 518 (e.g., an operator certificate, a shared key) to the relay node 102. The operator credentials may be issued by a certificate authority (CA) 520 of the operator's OAM&P system 112. In the implementation illustrated, the operator credentials can be stored in the trusted environment (TrE) 504 of the relay node 102. The operator credentials can be securely issued to the relay node 102 using the vendor credentials (e.g., private and public key pair) held in the trusted environment (TrE) 504 of the relay node 102.

In the implementation of FIG. 5, there are no new authentication and key agreement (AKA) credentials sent to the relay node 102. Instead, the operator's OAM&P system 112 can communicate with the home subscriber server (HSS) 514 to update 522 the relay node's subscription profile. Updating the subscription profile of the relay node 102 can include defining additional network entities (e.g., access point names (APNs)) that the relay node 102 is authorized to access. Such network entities can comprise those entities necessary for performing the functions of a relay device conveying traffic to and/or from one or more access terminals. In the example shown, the relay node management server (RN-MS) 524 of the operators OAM&P system 112 may comprise the entity to communicate with the home subscriber server (HSS) 514 for updating the subscription profile of relay node 102.

Referring now to FIG. 5B, the operator's OAM&P system 112 may also manage 526 the relay node 102 to configure the relay node 102 for use in the communication network as a relay device that conveys traffic between access terminals and network entities (e.g., access nodes, other relay nodes). Any conventional management protocol may be used for configuring the relay node 102 such as, for example, TR-069 or existing OAM&P protocols.

After the relay node 102 has received the operator credentials, and prior to operating in the network as a fully functioning relay device, the relay node 102 re-attaches to the network and is re-authenticated 528 using the initial authentication and key agreement (AKA) credentials stored in the UICC 502 of the relay node 102 together with the device credentials (e.g., the operator credentials) stored in the trusted environment (TrE) 504. In order to authenticate the relay node 102, the mobile management entity (MME) 110 can obtain 530 the relay node's new subscription and authentication information from the home subscriber server (HSS) 514. As noted previously, the new subscription and authentication information can indicate which network entities the initial relay node identity (e.g., IMSI) is allowed to access. Using the new subscription and authentication information obtained from the home subscriber server (HSS) 514, the mobile management entity (MME) 110 and the relay node 102 can communicate to authenticate the relay node 102. For example, the mobile management entity (MME) 110 may obtain a shared secret associated with the identity (e.g., IMSI) of the relay node 102, and may employ an authentication algorithm to verify the relay node 102.

After the relay node 102 is authenticated using the new subscription and authentication information associated with the relay node identity, the mobile management entity (MME) 110 may authorize 532 the relay node 102 as a fully operational relay device. That is, the relay node 102 may be authorized for access to any access point names (APNs) necessary for conveying traffic to and/or from one or more access terminals.

Exemplary Relay Node

Figure 6:
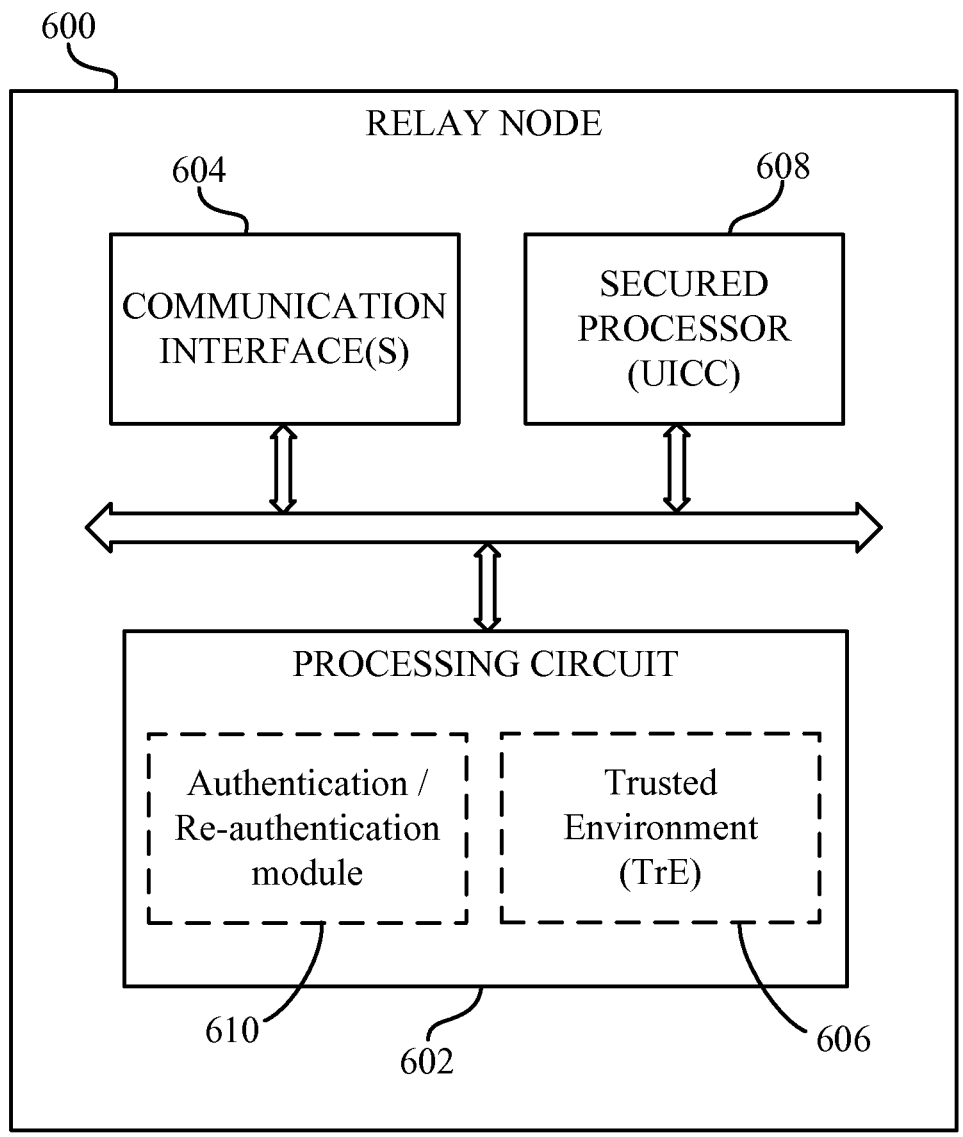
FIG. 6 is a block diagram illustrating select components of a relay node according to at least one embodiment.

FIG. 6 is a block diagram illustrating select components of a relay node 600 according to at least one embodiment. The relay node 600 generally includes a processing circuit 602 coupled to a wireless communication interface 604.

The processing circuit 602 is arranged to obtain, process and/or send data, control data access and storage, issue commands, and control other desired operations. The processing circuit 602 may comprise circuitry configured to implement desired programming provided by appropriate media in at least one embodiment. For example, the processing circuit 602 may be implemented as one or more of a processor, a controller, a plurality of processors and/or other structure configured to execute executable instructions including, for example, software and/or firmware instructions, and/or hardware circuitry. Embodiments of the processing circuit 602 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor but, in the alternative, the processor may be any conventional processor, controller, microcontroller, or state machine. A processor may also be implemented as a combination of computing components, such as a combination of a DSP and a microprocessor, a number of microprocessors, one or more microprocessors in conjunction with a DSP core, or any other such configuration. These examples of the processing circuit 602 are for illustration and other suitable configurations within the scope of the present disclosure are also contemplated.

The processing circuit 602 includes an authentication and re-authentication module 603. The authentication and re-authentication module 603 can comprise circuitry and/or programming adapted to perform authentication procedures using initial security credentials, and adapted to perform re-authentication procedures using new security credentials.

The communications interface 604 is configured to facilitate wireless communications of the relay node 600. For example, the communications interface 604 may be configured to communicate information bi-directionally with respect to other wireless devices, such as access terminals, access nodes, other relay nodes, etc. The communications interface 604 may be coupled to an antenna (not shown) and may include wireless transceiver circuitry, including at least one transmitter and/or at least one receiver (e.g., one or more transmitter/receiver chains) for wireless communications.

In some embodiments, the relay node 600 may include a trusted environment (TrE) 606. The trusted environment 606 may be adapted to meet the specifications for a trusted environment in the 3GPP Specification Detail at TS 33.320. The trusted environment 606 may be pre-provisioned (or securely embedded) with at least some of the initial security credentials. For example, the trusted environment 606 may have vendor credentials and/or initial authentication and key agreement (AKA) credentials stored therein.

In some embodiments, the relay node 600 may include a secured processor 608 that is pre-provisioned with initial security credentials, such as initial authentication and key agreement (AKA) credentials. The secured processor 608 may comprise a smart card, such as a universal integrated circuit card (UICC), and/or may include a universal subscriber identity module (USIM) application.

According to one or more features of the relay node 600, the processing circuit 602 may be adapted to perform any or all of the processes, functions, steps and/or routines related to the various relay nodes described herein above with reference to FIGS. 1-5 (e.g., relay node 102). As used herein, the term "adapted" in relation to the processing circuit 602 may refer to the processing circuit 602 being one or more of configured, employed, implemented, or programmed to perform a particular process, function, step and/or routine according to various features described herein.

Figure 7:
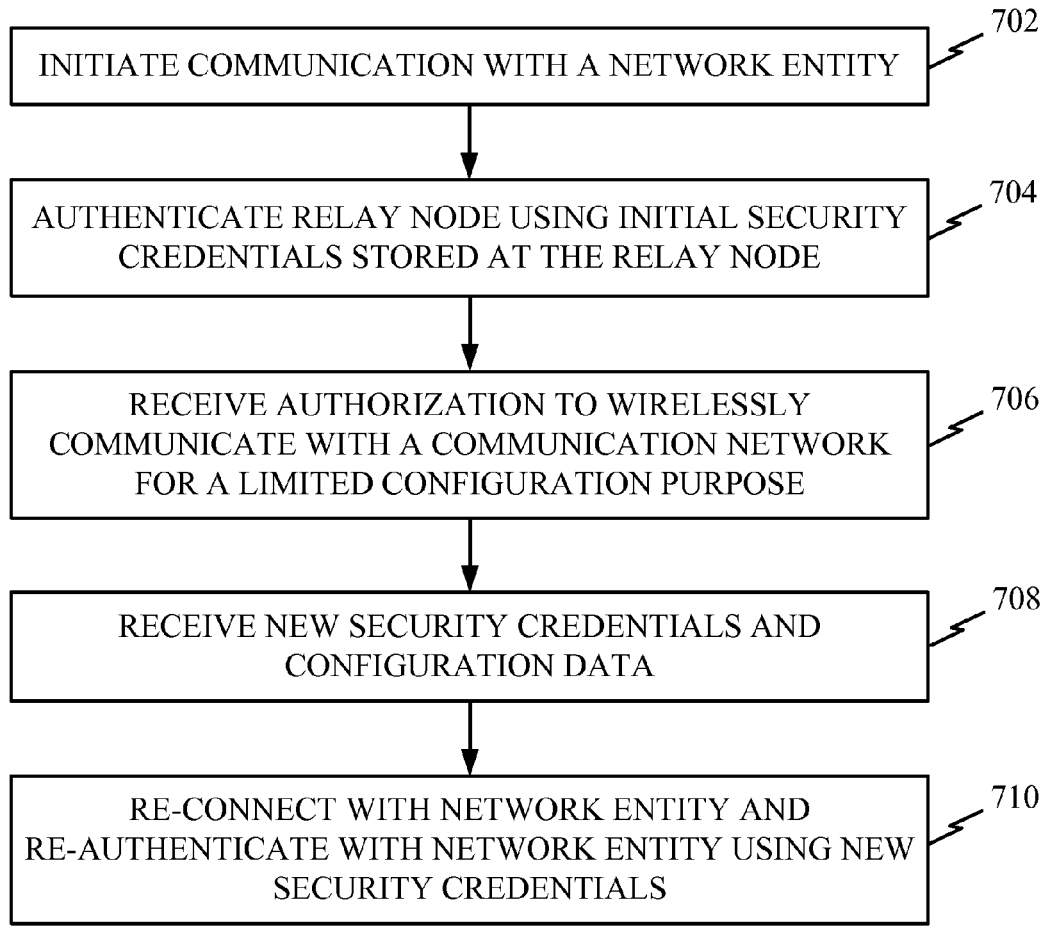
FIG. 7 is a flow diagram illustrating an example of at least one implementation of a method operational in a relay node.

FIG. 7 is a flow diagram illustrating an example of at least one implementation of a method operational in a relay node, such as relay node 600. With reference to both of FIGS. 6 and 7, a relay node 600 can initiate communication with a network entity at step 702. For example, the processing circuit 602 can wirelessly attach to a network entity (e.g., a mobile management entity (MME)) using the communications interface 604. At the time the relay node 600 initially attaches to the network entity, the relay node 600 may appear as a user device (e.g., an access terminal or client device) to the network entity.

At step 704, the relay node may wirelessly authenticate with the network entity using its initial security credentials. For example, the processing circuit 602 may authenticate the relay node to the network entity via the communications interface 604. In at least one implementation, the authentication and re-authentication module 603 can use initial security credentials stored at the relay node 600 to perform the authentication procedures. The authentication and re-authentication module 603 may employ any conventional authentication scheme, such as a challenge-response authentication. In some implementations, the initial security credentials employed by the authentication and re-authentication module 603 can include initial authentication and key agreement (AKA) credentials and/or vendor credentials (e.g., a vendor certificate). The initial authentication and key agreement (AKA) credentials may be stored on either the trusted environment (TrE) 606 or the secured processor 608 of the relay node 600. Vendor credentials may be stored in the trusted environment (TrE) 606.

The initial authentication and key agreement (AKA) credentials may include an initial relay node identity (e.g., IMSI) and an initial shared secret associated with the initial relay node identity. At the time of the wireless authentication, the initial relay node identity may be associated with a subscription profile in the communication network that authorizes network access to the relay node 600 for the limited purpose of initial configuration.

At step 706, the relay node 600 receives authorization to wirelessly communicate with the communication network for a limited configuration purpose. For example, the processing circuit 602 may receive, via the communications interface 604, authorization to wirelessly communicate with a limited portion of the communication network for obtaining new security credentials and, in some implementations, configuration data. The authorization can limit the relay node 600 to only accessing network entities that are involved in configuration and management of relay devices. In some implementations, the network access for the relay node 600 can be restricted by limiting the access point names (APNs) with which the relay node 600 is allowed to communicate.

Following the authorization to access the communication network, the relay node 600 receives new security credentials at step 708. For example, the processing circuit 602 can receive, via the communications interface 604, new security credentials from a management and configuration entity of the network, such as the operator's OAM&P system. In some implementations, the processing circuit 602 may receive new authentication and key agreement (AKA) credentials, such as a new relay node identity (e.g., a new IMSI) and a new shared secret associated with the new relay node identity. In some implementations, the processing circuit 602 may receive operator credentials, such as an operator certificate and/or a new shared key. The new security credentials can be stored by the processing circuit 602 in the trusted environment (TrE) 606. In some implementations, the relay node 600 may retain the same initial relay node identity (IMSI), but the initial relay node identity may be associated with a new subscription profile authorizing any necessary network access for the relay node 600 to operate as a relay device for conveying network traffic between one or more access terminals and the communication network.

According to at least some implementations, the relay node 600 may also receive configuration data in addition to the new security credentials. For example, the processing circuit 602 may receive configuration information adapted to enable the relay node 600 to operate as a relay device within the communication network. That is, the relay node 600 may obtain the proper configuration information to enable it to convey network traffic between access terminals and network entities (e.g., access nodes and/or other relay nodes) within the communication network.

After the relay node 600 receives and implements the new security credentials and any configuration data (if received), the relay node 600 can re-authenticate with the network entity using the new security credentials at step 710, prior to operating as a relay device in the communication network. For example, the processing circuit 602 can reconnect to the network entity via the communications interface 604, and can re-authenticate with the network entity using the new security credentials. In at least some implementations, the authentication and re-authentication module 603 can obtain the new security credentials from the trusted environment (TrE) 606, and may employ any conventional authentication scheme, such as a challenge-response authentication algorithm, using the new security credentials. At the time the relay node 600 reattaches to the network entity for re-authentication, the relay node 600 may appear as a relay device to the network entity.

Exemplary Network Entity

Figure 8:
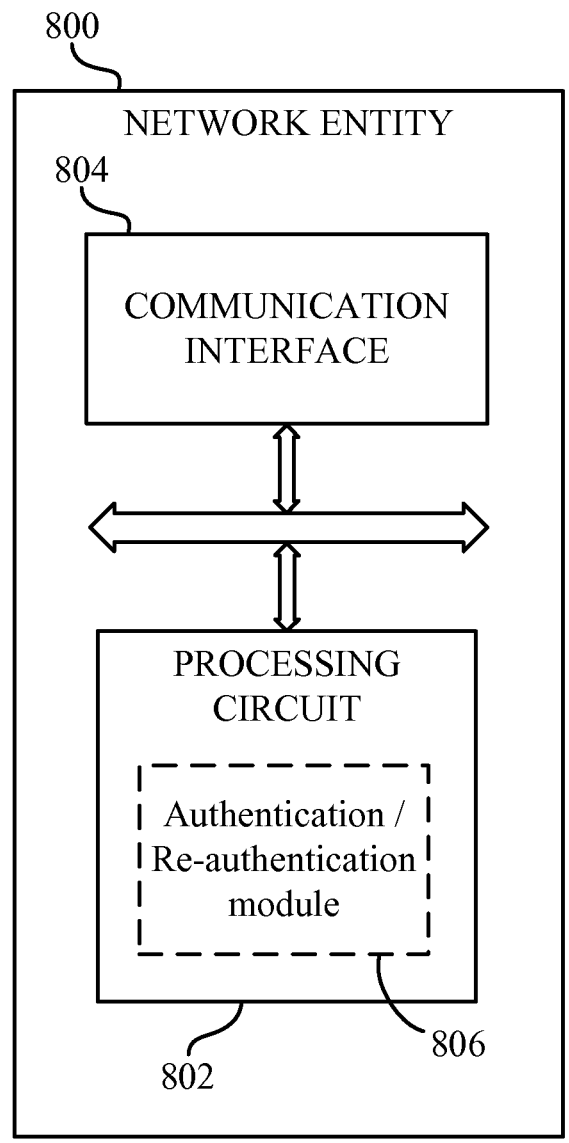
FIG. 8 is a block diagram illustrating select components of a network entity 800 according to at least one embodiment.

FIG. 8 is a block diagram illustrating select components of a network entity 800 according to at least one embodiment. The network entity 800 may include a processing circuit 802 coupled to a communications interface 804.

The processing circuit 802 is arranged to obtain, process and/or send data, control data access and storage, issue commands, and control other desired operations. The processing circuit 802 may comprise circuitry configured to implement desired programming provided by appropriate media in at least one embodiment. For example, the processing circuit 802 may be implemented as one or more of a processor, a controller, a plurality of processors and/or other structure configured to execute executable instructions including, for example, software and/or firmware instructions, and/or hardware circuitry. Embodiments of the processing circuit 802 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor but, in the alternative, the processor may be any conventional processor, controller, microcontroller, or state machine. A processor may also be implemented as a combination of computing components, such as a combination of a DSP and a microprocessor, a number of microprocessors, one or more microprocessors in conjunction with a DSP core, or any other such configuration. These examples of the processing circuit 802 are for illustration and other suitable configurations within the scope of the present disclosure are also contemplated.

The processing circuit 802 includes an authentication and re-authentication module 806. The authentication and re-authentication module 806 can comprise circuitry and/or programming adapted to perform authentication procedures for authenticating relay nodes using initial security credentials, and adapted to perform re-authentication procedures for subsequently authenticating relay nodes using new security credentials.

The communications interface 804 is configured to facilitate communications of the network entity 800 to communicate, either directly or indirectly (e.g., through one or more other network entities), with a relay node.

According to one or more features of the network entity 800, the processing circuit 802 may be adapted to perform any or all of the processes, functions, steps and/or routines related to the various network entities described herein above with reference to FIGS. 1-5 (e.g., mobile management entity (MME) 110, OAM&P 112). Furthermore, the network entity 800 may comprise a single entity, or a combination of two or more entities of the network. By way of example and not limitation, the network entity 800 may comprise a mobile management entity (MME), an operator's operations, administration, maintenance, and provisioning (OAM&P) system (e.g., relay node management system (RN-MS) and/or certificate authority (CA)), and/or a home subscriber server (HSS). As used herein, the term "adapted" in relation to the processing circuit 802 may refer to the processing circuit 802 being one or more of configured, employed, implemented, or programmed to perform a particular process, function, step and/or routine according to various features described herein.

Figure 9:
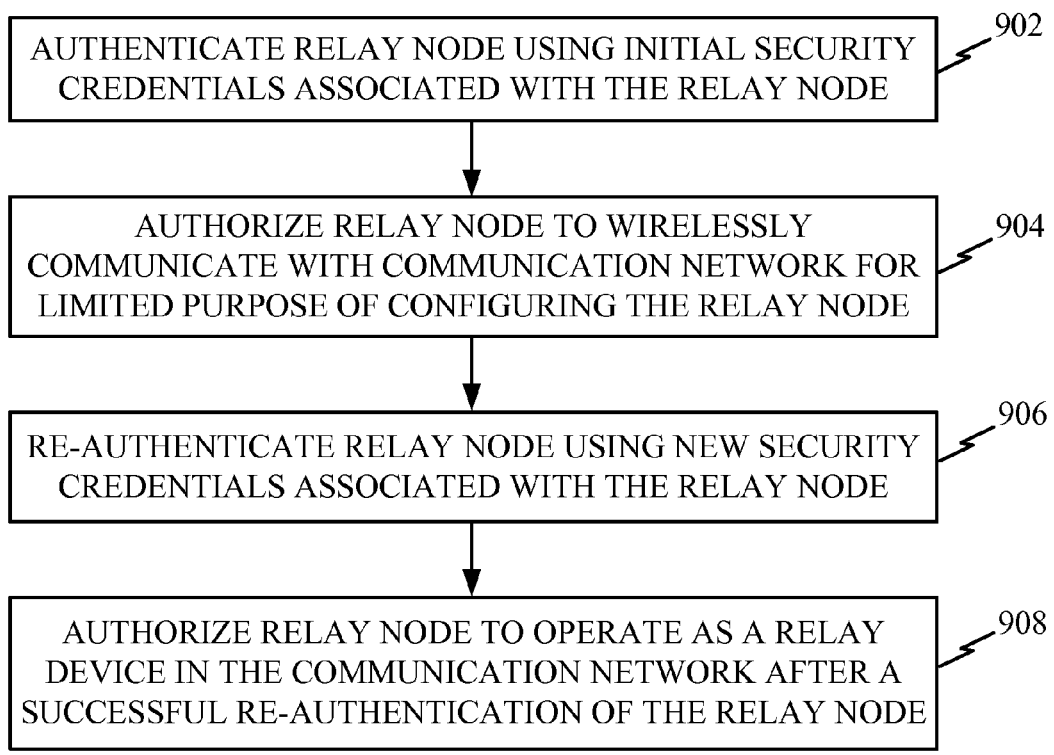
FIG. 9 is a flow diagram illustrating an example of at least one implementation of a method operational in a network entity.

FIG. 9 is a flow diagram illustrating an example of at least one implementation of a method operational in a network entity, such as network entity 800. With reference to both of FIGS. 8 and 9, a network entity may authenticate a relay node using initial security credentials associated with the relay node, at step 902. For example, the processing circuit 802 may communicate with a relay node via the communications interface 804 to authenticate the relay node. According to at least some implementations, the authentication and re-authentication module 806 may employ any conventional authentication scheme, such as a challenge-response authentication algorithm, to authenticate a relay node using the relay node's initial security credentials. At the time the relay node is authenticated by the network entity 800, the relay node may appear to the network entity 800 as a user device (e.g., an access terminal).

In some implementations, the initial security credentials can include initial authentication and key agreement (AKA) credentials and/or vendor credentials (e.g., a vendor certificate). The initial authentication and key agreement (AKA) credentials can include an initial relay node identity and an initial shared secret associated with the initial relay node identity.

At step 904, the network entity 800 can authorize the relay node to wirelessly communicate with the communication network for the limited purpose of configuring the relay node. For example, the processing circuit 802 may determine, based on the initial relay node identity, that the relay node is authorized for limited network access. In some implementations, the authentication and re-authentication module 806 may obtain a subscription profile associated with the initial relay node identity during the authentication, where the subscription profile indicates that the relay node is authorized to access the communication network for a limited purpose of configuring the relay node. The processing circuit 802 can be adapted to limit the network access for the relay node by restricting the access point names (APNs) with which the relay node is allowed to communicate.

According to at least some implementations, the network entity 800 can authorize the relay node to communicate for the limited purpose of obtaining new security credentials and configuration data. That is, the processing circuit 802 may be adapted to authorize the relay node to communicate with the communication network in order for the relay node to obtain new security credentials and configuration data, while restricting the relay node from wireless communication for other purposes.

Following the authentication and authorization of the relay node, and after the relay node has obtained new security credentials and configuration data from the communication network, the network entity 800 re-authenticates the relay node using the new security credentials associated with the relay node, at step 906. For example, the processing circuit 802 can re-authenticate the relay node using the new security credentials. In at least some implementations, the authentication and re-authentication module 806 may employ a conventional authentication scheme, such as a challenge-response authentication algorithm, using the new security credentials to authenticate the relay node using its new security credentials. At the time the network entity 800 re-authenticates the relay node, the relay node may appear to the network entity 800 as a relay device. The relay node may appear as a network device to subscriber or client terminals that use the relay node for relaying communications to the communication network.

In at least some implementations, the new security credentials may include new authentication and key agreement (AKA) credentials, such as a new relay node identity (e.g., a new IMSI) and a new shared secret associated with the new relay node identity. In such implementations, the authentication and re-authentication module 806 may obtain a subscription profile associated with the new relay node identity during the re-authentication procedures, where the subscription profile authorizes network access to the relay node for operating as a relay device conveying traffic between one or more access terminals and the communication network.

In at least some implementations, the authentication and re-authentication module 806 may re-authenticate the relay node using both the new security credentials and the initial security credentials. In such implementations, the new security credentials may include operator credentials, such as an operator certificate, and/or a new shared key. The initial security credentials employed in combination with the new security credentials may include the initial relay node identity (IMSI), but the initial relay node identity may be associated with a new subscription profile authorizing any necessary network access for the relay node to operate as a relay device for conveying network traffic between one or more access terminals and the communication network. In such implementations, the authentication and re-authentication module 806 may obtain the new subscription profile associated with the initial relay node identity during the re-authentication procedure.

In response to a successful re-authentication of the relay node, the network entity 800 may, at step 908, authorize the relay node to operate as a relay device in the communication network. For example, the processing circuit 802 can authorize the relay node, based on a successful re-authentication, to operate as a relay device conveying traffic between one or more access terminals and the communication network.

One or more of the components, steps, features and/or functions illustrated in FIGS. 1, 2, 3, 4, 5, 6, 7, 8, 9 and/or 10 may be rearranged and/or combined into a single component, step, feature or function or embodied in several components, steps, or functions. Additional elements, components, steps, and/or functions may also be added without departing from the present disclosure. The apparatus, devices, and/or components illustrated in FIGS. 1, 6 and/or 8 may be configured to perform one or more of the methods, features, or steps described in FIGS. 2, 3, 4, 5, 7 and/or 9. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The terms "machine-readable medium", "computer-readable medium", and/or "processor-readable medium" may include, but are not limited to portable or fixed storage devices, optical storage devices, and various other non-transitory mediums capable of storing, containing or carrying instruction(s) and/or data. Thus, the various methods described herein may be partially or fully implemented by instructions and/or data that may be stored in a "machine-readable medium", "computer-readable medium", and/or "processor-readable medium" and executed by one or more processors, machines and/or devices.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of non-transitory storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the disclosure. As such, the present teachings can be readily applied to other types of apparatuses and many alternatives, modifications, and variations will be apparent to those skilled in the art.

What is claimed is:

1. A relay node, comprising:
a wireless communication interface; and
a processing circuit coupled to the wireless communication interface, the processing circuit adapted to:
   authenticate the relay node to a network entity via the wireless communication interface using initial security credentials;
   receive, in response to the wireless authentication using the initial security credentials, authorization to wirelessly communicate with a communication network for a limited purpose of configuring the relay node;
   receive new security credentials via the wireless communication interface; and
   re-authenticate the relay node to the network entity using the new security credentials prior to operating as a relay device in the communication network.

2. The relay node of claim 1, wherein the new security credentials include a new relay node identity and a new shared secret associated with the new relay node identity; and the processing circuit is further adapted to:
   re-authenticate the relay node to the network entity using the new relay node identity and the new shared secret associated with the new relay node identity prior to operating as a relay device in the communication network.

3. The relay node of claim 2, wherein the new relay node identity is associated with a subscription profile authorizing network access to the relay node for operating as a relay device conveying traffic between one or more access terminals and the communication network.

4. The relay node of claim 1, wherein the processing circuit is further adapted to:
   re-authenticate the relay node to the network entity using the new security credentials and the initial security credentials.

5. The relay node of claim 1, wherein the new security credentials include at least one of operator credentials or a shared key.

6. The relay node of claim 1, wherein the initial security credentials include an initial relay node identity and an initial shared secret associated with the initial relay node identity.

7. The relay node of claim 6, wherein:
at the time of the authentication with the network entity, the initial relay node identity is associated with a subscription profile authorizing network access to the relay node for a limited purpose of configuring the relay node; and
at the time of the re-authentication with the network entity, the initial relay node identity is associated with a new subscription profile authorizing network access to the relay node for operating as a relay device conveying traffic between one or more access terminals and the communication network.

8. The relay node of claim 1, further comprising a trusted environment coupled to the processing circuit, wherein the processing circuit is further adapted to:
   store the new security credentials in the trusted environment.

9. The relay node of claim 8, wherein at least some of the initial security credentials are stored in the trusted environment.

10. The relay node of claim 1, further comprising a secured processor coupled to the processing circuit, wherein at least some of the initial security credentials are stored in the secured processor.

11. The relay node of claim 1, wherein the processing circuit is further adapted to:
   receive configuration data via the wireless communications interface for configuring the relay node as a relay device in the communication network, the configuration data being received prior to re-authentication to the network entity.

12. The relay node of claim 1, wherein:
the relay node appears as a user device to the network entity when authenticating with the network entity with the initial security parameters; and
the relay node appears as a relay device when re-authenticating with the network entity with the new security parameters.

13. A method operational on a relay node, comprising:
wirelessly authenticating the relay node to a network entity using initial security credentials;
receiving authorization to wirelessly communicate with a communication network for a limited purpose of configuring the relay node in response to the wireless authentication using the initial security credentials;
receiving new security credentials; and
re-authenticating the relay node to the network entity using the new security credentials prior to being enabled to operate as a relay device in the communication network.

14. The method of claim 13, wherein:
receiving the new security credentials comprises receiving a new relay node identity and a new shared secret associated with the new relay node identity; and
re-authenticating with the network entity using the new security credentials comprises re-authenticating with the network entity using the new relay node identity and the new shared secret associated with the new relay node identity.

15. The method of claim 14, wherein the new relay node identity is associated with a subscription profile authorizing network access to the relay node for operating as a relay device conveying traffic between one or more access terminals and the communication network.

16. The method of claim 13, wherein re-authenticating with the network entity using the new security credentials further comprises:
   re-authenticating with the network entity using the new security credentials and the initial security credentials.

17. The method of claim 16, further comprising:
wirelessly authenticating with the network entity using an initial relay node identity and an initial shared secret associated with the initial relay node identity, wherein the initial relay node identity is associated with a subscription profile authorizing network access to the relay node for a limited purpose of configuring the relay node at the time of the wireless authentication with the network entity; and
re-authenticating with the network entity using the initial relay node identity and the initial shared secret associated with the initial relay node identity, wherein, at the time of the re-authentication with the network entity, the initial relay node identity is associated with a new subscription profile authorizing network access to the relay node for operating as a relay device conveying network traffic between one or more access terminals and the communication network.

18. The method of claim 13, wherein receiving the new security credentials comprises receiving at least one of operator credentials or a shared key.

19. The method of claim 13, further comprising:
appearing as a user device to the network entity when wirelessly authenticating with the network entity using the initial security credentials; and
appearing as a relay device to the network entity when re-authenticating with the network entity using the new security credentials.

20. The method of claim 13, further comprising:
receiving configuration data for configuring the relay node as a relay device in the communication network, the configuration data being received prior to re-authentication to the network entity.

21. A relay node, comprising:
means for wirelessly authenticating with a network entity using initial security credentials;
means for receiving authorization to wirelessly communicate with a communication network for a limited purpose of configuring the relay node in response to the wireless authentication using the initial security credentials;
means for receiving new security credentials; and
means for re-authenticating with the network entity using the new security credentials prior to being enabled to operate as a relay device in the communication network.

22. A non-transitory processor-readable medium comprising instructions operational on a relay node, which when executed by a processor causes the processor to:
wirelessly authenticate the relay node to a network entity using initial security credentials;
receive authorization to wirelessly communicate with a communication network for a limited purpose of configuring the relay node in response to the wireless authentication using the initial security credentials;
receive new security credentials; and
re-authenticate the relay node to the network entity using the new security credentials prior to being enabled to operate as a relay device in the communication network.

23. A network entity, comprising:
a communications interface; and
a processing circuit coupled to the communications interface, the processing circuit adapted to:
authenticate a relay node using initial security credentials associated with the relay node;
authorize the relay node to wirelessly communicate with a communication network for a limited purpose of configuring the relay node after a successful authentication of the relay node using the initial security credentials;
re-authenticate the relay node using new security credentials; and
authorize the relay node to operate as a relay device in the communication network after a successful re-authentication of the relay node.

24. The network entity of claim 23, wherein the processing circuit is adapted to authorize the relay node to wirelessly communicate with the communication network for a limited purpose of obtaining new security credentials and configuration data.

25. The network entity of claim 23, wherein the new security credentials include a new relay node identity and a new shared secret associated with the new relay node identity.

26. The network entity of claim 25, wherein the processing circuit is further adapted to:
obtain a subscription profile associated with the new relay node identity when re-authenticating the relay node, wherein the subscription profile authorizes network access to the relay node for operating as a relay device conveying traffic between one or more access terminals and the communication network.

27. The network entity of claim 23, wherein the new security credentials include at least one of operator credentials or a shared key.

28. The network entity of claim 23, wherein the processing circuit is adapted to:
re-authenticate the relay node using the new security credentials and the initial security credentials.

29. The network entity of claim 28, wherein the initial security credentials include an initial relay node identity and an initial shared secret associated with the initial relay node identity.

30. The network entity of claim 29, wherein the processing circuit is further adapted to:
obtain a subscription profile associated with the initial relay node identity to authenticate the relay node using the initial security credentials, wherein the subscription profile authorizes network access for the relay node for a limited purpose of configuring the relay node;
obtain a new subscription profile associated with the initial relay node identity to re-authenticate the relay node using the new security credentials, wherein the new subscription profile authorizes sufficient network access for the relay node to enable the relay node to operate as a relay device conveying traffic between one or more access terminals and the communication network.

31. The network entity of claim 23, wherein the relay node appears as a user device when authenticated using the initial security credentials, and the relay node appears as a relay device when re-authenticating using the new security credentials.

32. The network entity of claim 23, wherein the network entity comprises a mobile management entity (MME).

33. A method operational on a network entity, comprising:
authenticating a relay node using initial security credentials associated with the relay node;
authorizing the relay node to wirelessly communicate with a communication network for a limited purpose of configuring the relay node after a successful authentication of the relay node using the initial security credentials;
re-authenticating the relay node using new security credentials; and
authorizing the relay node to operate as a relay device in the communication network after successfully re-authenticating the relay node.

34. The method of claim 33, wherein authorizing the relay node to wirelessly communicate with a communication network for a limited purpose of configuring the relay node, comprises:
authorizing the relay node to wirelessly communicate with a communication network for a limited purpose of obtaining new security credentials and configuration data.

35. The method of claim 33, wherein re-authenticating the relay node using the new security credentials, includes:
re-authenticating the relay node using a new relay node identity and a new shared secret associated with the new relay node identity.

36. The method of claim 35, wherein re-authenticating the relay node using the new relay node identity and the new shared secret associated with the new relay node identity comprises:
obtaining a subscription profile associated with the new relay node identity, wherein the subscription profile authorizes network access to the relay node for operating as a relay device conveying traffic between one or more access terminals and the communication network.

37. The method of claim 33, wherein the new security credentials include at least one of operator credentials or a shared key.

38. The method of claim 33, wherein re-authenticating the relay node comprises:
re-authenticating the relay node using the new security credentials and the initial security credentials.

39. The method of claim 38, wherein the initial security credentials include an initial relay node identity and an initial shared secret associated with the initial relay node identity.

40. The method of claim 39, wherein:
authenticating the relay node using the initial security credentials comprises obtaining a subscription profile associated with the initial relay node identity, wherein the subscription profile authorizes network access for the relay node for a limited purpose of configuring the relay node; and
re-authenticating the relay node using the new security credentials comprises obtaining a new subscription profile associated with the initial relay node identity, wherein the new subscription profile authorizes sufficient network access for the relay node to enable the relay node to operate as a relay device conveying traffic between one or more access terminals and the communication network.

41. The method of claim 33, wherein:
authenticating the relay node using the initial security credentials comprises authenticating the relay node appearing to the network entity as a user device; and
re-authenticating the relay node using the new security credentials comprises re-authenticating the relay node appearing to the network entity as a relay device.

42. A network entity, comprising:
means for authenticating a relay node using initial security credentials associated with the relay node;
means for authorizing the relay node to wirelessly communicate with a communication network for a limited purpose of configuring the relay node after a successful authentication of the relay node using the initial security credentials;
means for re-authenticating the relay node using new security credentials; and
means for authorizing the relay node to operate as a relay device in the communication network after successfully re-authenticating the relay node.

43. A non-transitory processor-readable medium comprising instructions operational on a network entity, which when executed by a processor causes the processor to:
authenticate a relay node using initial security credentials associated with the relay node;
authorize the relay node to wirelessly communicate with a communication network for a limited purpose of configuring the relay node after a successful authentication of the relay node using the initial security credentials;
re-authenticate the relay node using new security credentials; and
authorize the relay node to operate as a relay device in the communication network after successfully re-authenticating the relay node.

* * * * *